US012795743B2

(12) United States Patent
Penev et al.

(10) Patent No.: US 12,795,743 B2
(45) Date of Patent: Nov. 10, 2026

(54) RANDOM ACCESS PROCEDURE FOR WIRELESS NETWORK

(71) Applicant: WILDSTAR, LLC, Saratoga, CA (US)

(72) Inventors: Parashkev Petrov Penev, Voerde (DE); Johannes Westmeijer, Dorsten (DE)

(73) Assignee: WildStar LLC, Arlington, TX (US)

( * ) Notice: Subject to any disclaimer, the term of this patent is extended or adjusted under 35 U.S.C. 154(b) by 285 days.

(21) Appl. No.: 18/777,051

(22) Filed: Jul. 18, 2024

(65) Prior Publication Data

US 2025/0126653 A1 Apr. 17, 2025

Related U.S. Application Data

(60) Provisional application No. 63/590,466, filed on Oct. 16, 2023.

(51) Int. Cl.
*H04W 74/0833* (2024.01)
*H04W 84/06* (2009.01)

(52) U.S. Cl.
CPC ........ *H04W 74/0833* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 2021/0119697 A1* | 4/2021 | Wang | ................... | H04B 7/1853 |
| 2023/0247673 A1* | 8/2023 | Xu | ..................... | H04B 7/18563 370/329 |
| 2025/0168892 A1* | 5/2025 | Wu | ..................... | H04W 74/004 |

OTHER PUBLICATIONS

Kodheli et al., "Random Access Procedure Over Non-Terrestrial Networks: From Theory to Practice" IEEE Access, vol. 9, Jul. 30, 2021, pp. 109130-109143.
Chuang et al., "Enhanced RACH Occasion in LEO-Based Non-Terrestrial Networks," ICC 2023—IEEE International Confernece on Communications, , May 28, 2023, pp. 283-289.
International Application No. PCT/US2024/038562, International Search Report and Written Opinion mailed Nov. 7, 2024, 12 pages.

* cited by examiner

*Primary Examiner* — Angela Nguyen
(74) *Attorney, Agent, or Firm* — Erin P. Madill

(57) ABSTRACT

The disclosed technology is generally directed to a method for communication by a user equipment (UE) and a network node of a non-terrestrial network. In one example of the technology, the method may include receiving by the UE a configuration message from the network node and decoding by the UE the configuration message to obtain a delay parameter. The method further includes determining a delay value based on the delay parameter and a set of attributes associated with the UE. The set of attributes includes at least one attribute uniquely identifying the UE. The method further includes generating a Physical Random Access Channel (PRACH) signal at the UE and delaying transmission of the PRACH signal by the UE to the network node based on the delay value. The PRACH signal is processible by the network node to establish a connection between the UE and the network node.

23 Claims, 10 Drawing Sheets

RANDOM ACCESS PROCEDURE FOR WIRELESS NETWORK

CROSS REFERENCE TO RELATED APPLICATIONS

This application claims the benefit of U.S. Provisional Application Ser. No. 63/590,466, filed on Oct. 16, 2023, the disclosure of which is incorporated herein by reference.

TECHNICAL FIELD

This disclosure is directed to wireless networks, and more particularly, to random access procedures for wireless networks, such as non-terrestrial networks (NTNs).

BACKGROUND

The evolution of technology in the field of telecommunications and network communications has led to the development of Non-Terrestrial Networks (NTNs), encompassing a wide array of satellite, airborne, and space-based communication systems. NTNs are important in providing connectivity across vast geographic regions, particularly in remote and challenging terrains where traditional terrestrial networks may be impractical or unavailable.

One aspect of NTN operation relates to the establishment of communication links between user equipment or devices and the satellite or non-terrestrial components of the network. The establishment of the communication links involves the initiation of a connection or access to the network, a process commonly referred to as a random access procedure. The random access procedure allows the user equipment to obtain network access, transmit data, and receive services. The random access procedure serves as the gateway for the user equipment to synchronize and communicate with NTNs, enabling large number of applications, including voice, data, internet access, and remote sensing. Given the dynamic and unpredictable nature of NTN environments, which may include mobile or vehicular user terminals, Internet of Things (IoT) devices, or sensors deployed in remote areas, the random access procedure plays an important role in ensuring seamless connectivity and efficient resource allocation.

Conventional random access procedures developed for terrestrial networks may not be directly applicable to NTNs due to rather unique or different challenges posed by satellite communication, including propagation delays, limited bandwidth, interference, large coverage areas and the need to manage large numbers of users simultaneously. Therefore, in light of the foregoing, there is a need for a technical solution to overcome the challenges associated with conventional random access procedures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, an exemplary embodiment of the present disclosure may provide a method for communication by a user equipment (UE) to delay transmission of a Physical Random Access Channel (PRACH) signal to establish a connection between the UE and a network node of a non-terrestrial network (NTN), which may be a base station that is implemented in conjunction with a satellite. Implementations of the described techniques may include hardware, or a non-transitory, a computer readable medium, etc. Other embodiments of this aspect include corresponding computer systems, apparatus, and computer programs recorded on one or more computer storage devices, each configured to perform the actions of the methods. The system may include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features.

In accordance with the method the UE may receive a configuration message from the network node and decode the configuration message to obtain a delay parameter. Further, the UE determines a delay value based on the delay parameter and a set of attributes associated with the UE and generates a PRACH signal the transmission of which to the network node is delayed based on the delay value. The PRACH signal is processible by the network node to establish a connection between the UE and the network node.

In an exemplary embodiment of the present disclosure, the set of attributes includes at least one attribute uniquely identifying the UE. The set of attributes includes at least one of: an International Mobile Subscriber Identity (IMSI) number, a Radio Network Temporary Identifier (RNTI), and an International Mobile Equipment Identity (IMEI). In case of a change in the communication session, the set of attributes may be from a previous communication session between the UE and a base station.

In an exemplary embodiment of the present disclosure, the configuration message may be received by way of a system information block 1 (SIB1). After the configuration message is decoded, the delay value may be determined. The delay value may be an arbitrary random delay associated with the UE. The arbitrary random delay may be, for example, a pseudorandom binary sequence associated with the UE.

In one embodiment, to determine the delay value, the UE may scramble at least one of the set of attributes by a pseudorandom binary sequence to generate a scrambled sequence and compute a modulo operation on the scrambled sequence to generate the delay value. The scrambling of the at least one of the set of attributes includes at least one of: scrambling a binary representation of a Radio Network Temporary Identifier (RNTI) when the RNTI is available and scrambling an International Mobile Subscriber Identity (IMSI) number when the RNTI is unavailable.

In an exemplary embodiment of the present disclosure, the delay parameter is a bit encoded field in the configuration message. In some implementations, the delay parameter may indicate that transmission of the PRACH signal is to be enabled and disabled. The transmission of the PRACH signal may be delayed by a time period based on the delay parameter. For instance, if the delay parameter indicates enabling of delay in transmission of the PRACH signal, the UE may transmit the PRACH signal to the network node (e.g., base station) after a time period corresponding to the delay value has lapsed.

The UE may initiate transmission of the PRACH signal to the network node when the UE is in one of: an idle state, an inactive state, and a connection failed state to connect with the network node, which may be a base station of a satellite.

In another aspect, an exemplary embodiment of the present disclosure may provide method for communication by a network node in an NTN. In accordance with the method, the network node transmits information to a UE for determining a delay value based on a set of attributes associated with the UE. The set of attributes includes at least one attribute uniquely identifying the UE. Further, the network node receives a PRACH signal from the UE which is processible to establish a connection between the UE and the network node. The transmission of the PRACH signal by the UE to the network node is delayed based on the delay value.

In an exemplary embodiment of the present disclosure, the network node transmits information to each of a plurality of UEs that may be used for determining a corresponding delay value based on a corresponding set of attributes associated with a respective UE of the plurality of UEs. In some cases, the network node transmits a plurality of configuration messages to the plurality of UEs. Each of the plurality of configuration messages may be decoded by the respective UE to obtain a corresponding delay parameter based on which the delay value is determined by the respective UE. Further, the network node receives a plurality of PRACH signals. Transmission of each of the plurality of PRACH signals by the respective UE to the network node may be delayed based on the corresponding delay value. Each PRACH signal is processible by the network node to establish a connection between the respective UE and the network node.

In an exemplary embodiment of the present disclosure, the network node may receive a first PRACH signal of the plurality of PRACH signals from a first UE of the plurality of UEs after a first time period corresponding to the corresponding delay value has lapsed. The first PRACH signal is processible by the network node to establish a first connection between the first UE and the network node. In addition, the network node may receive a second PRACH signal from a second UE of the plurality of UEs after a second time period corresponding to the corresponding delay value has lapsed. The second PRACH signal is processible by the network node to establish a second connection between the second UE and the network node. The second connection may be established before or after the first connection.

In another aspect, an exemplary embodiment of the present disclosure may provide an apparatus for communication at a UE. The apparatus includes at least one processor and a memory coupled to the processor. The processor and the memory are configured to determine a delay value based on a set of attributes associated with the UE and generate a PRACH signal. The set of attributes includes at least one attribute uniquely identifying the UE. The processor and the memory are further configured to delay transmission of the PRACH signal by the UE to a network node of a non-terrestrial network based on the delay value to establish a connection between the UE and the network node.

In another aspect, an exemplary embodiment of the present disclosure may provide an apparatus for communication at a network node in an NTN. The apparatus includes at least one processor and a memory coupled to the processor. The processor and the memory are configured to transmit information to a UE for determining a delay value based on a set of attributes associated with the UE. The set of attributes includes at least one attribute uniquely identifying the UE. The processor and the memory are further configured to receive a PRACH signal. The transmission of the PRACH signal by the UE to the network node is delayed based on the delay value to establish a connection between the UE and the network node.

Further aspects, features, applications and advantages of the disclosed technology, as well as the structure and operation of various examples, are described in detail below with reference to the accompanying drawings. It is noted that the disclosed technology is not limited to the specific examples described herein. Such examples are presented herein for illustrative purposes only. Additional examples will be apparent to persons skilled in the relevant art(s) based on the teachings contained herein.

BRIEF DESCRIPTION OF THE SEVERAL VIEWS OF THE DRAWINGS

For a better understanding of the present disclosure, non-limiting and non-exhaustive examples of the present disclosure are described with reference to the following drawings, in which.

In the drawings, similar reference numerals refer to similar parts throughout the drawings unless otherwise specified. These drawings are not necessarily drawn to scale.

DETAILED DESCRIPTION

Figure 1A:
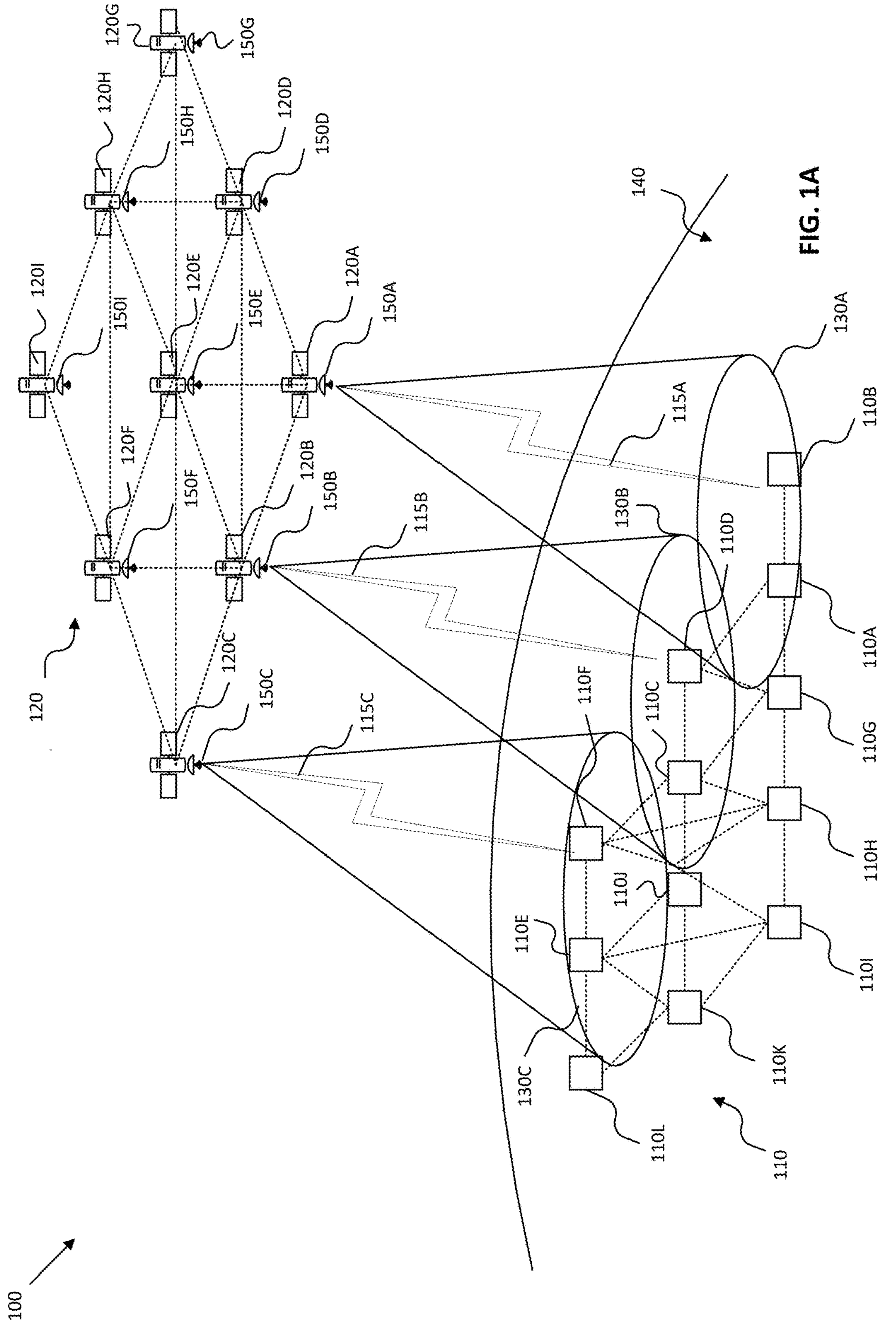
FIG. 1A is a simplified diagram illustrating a non-terrestrial network communication system in which aspects of the technology may be employed.

Technologies are provided for establishing a connection between a user equipment (UE) and a network node of a non-terrestrial network (NTN). Technologies are also provided for delaying transmission of a Physical Random Access Channel (PRACH) signal for establishing a connection between the UE and the network node. The specification and accompanying drawings disclose one or more exemplary embodiments that incorporate the features of the present disclosure. The scope of the present disclosure is not limited to the disclosed embodiments. The disclosed embodiments merely exemplify the present disclosure, and modified versions of the disclosed embodiments are also encompassed by the present disclosure. Embodiments of the present disclosure are defined by the claims appended hereto.

It is noted that any section/subsection headings provided herein are not intended to be limiting. Any embodiments described throughout this specification, and disclosed in any section/subsection may be combined with any other embodiments described in the same section/subsection and/or a different section/subsection in any manner.

Implementations of the techniques described herein may include hardware, a method or process, or a non-transitory computer readable medium, etc. Other embodiments of this aspect include corresponding computer systems, apparatus, and computer programs recorded on one or more computer storage devices, each configured to perform the actions of the methods. The system may include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features. Prior to describing exemplary embodiments that incorporate the features of the present disclosure, a discussion of security concepts that are applicable to the exemplary embodiments will be provided.

A wireless communications system may be a non-terrestrial network (NTN) including a satellite (e.g., a non-geostationary satellite) that includes a base station that is configured to communicate with multiple user equipment (UE) in a given coverage area. In this regard, the satellite, which includes a base station, serves or acts as a network node. Some techniques for random access related to wireless transmissions in terrestrial wireless networks may need to be improved for non-terrestrial networks.

During an initial access procedure, the UE attempts to establish a connection with a network, such as the NTN, and it transmits a PRACH signal to a base station of the network to request access. Before transmitting the PRACH signal, the UE selects a Random Access Preamble (RAP) from a set of pre-defined sequences. The RAP serves as an identifier to uniquely identify the UE's access request.

Upon receiving the PRACH signal, the base station decodes the RAP and identifies the UE's temporary identity, which is a Radio Network Temporary Identifier (RNTI) of the UE. The RNTI of the UE is utilized to distinguish and manage communication with the UE. After decoding the RAP and identifying the UE using the UE RNTI, the base station sends a response to the UE, which may include allocating dedicated resources for further communication.

International Mobile Subscriber Identity (IMSI)

IMSI is a unique identifier assigned to each subscriber in a wireless network, e.g., a mobile network. The IMSI is stored on the subscriber's Subscriber Identity Module (SIM) card, which is inserted into the UE. The IMSI includes of three main components: Mobile Country Code (MCC), Mobile Network Code (MNC), and Mobile Subscriber Identification Number (MSIN). MCC is a three-digit code that identifies the country where the subscriber is registered. For example, "310" represents the United States. MNC is a two or three-digit code that identifies the mobile network operator within the country. Each operator has a unique MNC. For example, "410" represents AT&T in the United States. MSIN is a variable-length number that uniquely identifies the subscriber within the mobile network. The length of the MSIN depends on the specific requirements of the network operator. By combining the aforementioned three components, the IMSI provides a globally unique identifier for each subscriber (i.e., for each UE). The IMSI is used by the mobile network to authenticate and identify subscribers, establish connections, and manage various services such as voice calls, data communication, and messaging.

UE RNTI

In 3rd Generation Partnership Project (3GPP) standards, User Equipment Radio Network Temporary Identity (UE RNTI) refers to a temporary identifier assigned to a UE, which refers to a mobile device or subscriber in a cellular network. The UE RNTI is used in the Radio Access Network (RAN) to distinguish and manage communication with individual UEs. UE RNTI is a 16-bit value that is assigned by the base station (eNodeB in long term evolution (LTE) or gNodeB in 5th Generation (5G)) to identify a specific UE within the cell or the wireless channel. The UE RNTI is temporary and may change during the UE's communication session or when the UE moves between different cells.

The UE RNTI serves various purposes in the radio interface, including differentiation, paging, connection setup, and radio resource allocation. Differentiation helps the base station differentiate between multiple UEs in the same cell or on the same radio channel. Paging helps to address specific UEs when the network wants to initiate communication or send a notification to a particular device. Connection setup during the initial connection establishment process corresponds to the base station assigning a UE RNTI to the UE for further communication. Radio resource allocation is used to assign and manage radio resources, such as time slots or frequency channels, to the UE for data transmission and reception. The UE RNTI is specific to the radio interface and is not globally unique like the IMSI. The UE RNTI is used internally within the radio access network to facilitate communication and resource management between the base station and the UE.

System Information Block 1 (SIB1)

In 3GPP standards, SIB1 stands for System Information Block Type 1. SIB1 is a specific type of system information broadcasted by the base station (eNodeB in LTE or gNodeB in 5G) in a cellular network. SIB1 carries information that allows the UE to access and establish a connection with the network. Features and information elements contained in SIB1 include cell identity, physical cell identifier (ID), cell reselection parameters, Public Land Mobile Network (PLMN), supported frequency bands, system bandwidth, and network access parameters. The Cell Identity (Cell ID) information uniquely identifies the specific cell within the network. The Physical Cell ID indicates a physical identity of the cell within the serving eNodeB or gNodeB. The Physical Cell ID is used by the UE to synchronize and access the cell during initial connection establishment. The cell reselection parameters are related to cell reselection, such as the cell reselection threshold, which defines the criteria for a UE to switch to a different cell when its signal quality drops below a certain level. The PLMN provides information about the Public Land Mobile Network, such as the MCC and the MNC, which identify the network operator.

The supported frequency bands indicate the frequency bands supported by the cell, allowing the UE to determine if the UE is compatible with the network's available frequencies. The system bandwidth of the cell indicates the amount of frequency spectrum allocated to the cell. The network access parameters are related to network access, such as the random access configuration, which determines the procedure and parameters for the UE to request access to the network. The SIB1 is used for the initial access and connection establishment of a UE in a cellular network. Upon receiving SIB1, the UE may gather the information to synchronize with the cell, identify the network, and perform subsequent procedures to access the services provided by the network.

PRACH Signal

In a 5G communication system, the PRACH signal serves an important role in establishing communication between a UE and a base station (BS), which is a part of the network infrastructure. The PRACH signal is utilized during the initial connection setup phase and in certain other scenarios to enable efficient access to the network. The purpose and functionality of the PRACH signal include the following:

Initial Access: When a UE wants to establish a connection with the 5G network (attach or reattach), the UE needs a way to gain the attention of the network's Base Stations. The PRACH is used for this initial access. When the UE is powered on or enters a new cell's coverage area, the UE transmits a PRACH signal.

Contention-Based Random Access: Many 5G networks employ a contention-based random access mechanism for multiple UEs to share the limited radio resources efficiently. Since multiple UEs may want to establish a connection simultaneously or within a short timeframe, multiple UEs could potentially collide if they all tried to transmit at once. The PRACH helps mitigate this issue.

Network Synchronization: The PRACH further helps with network synchronization. When the UE sends out the PRACH signal, the network may use the timing information included in the signal to synchronize with the UE which may be important for proper communication and coordination between the UE and the network.

Timing Advance Estimation: The timing information within the PRACH signal assists the network in estimating the timing advance for the UE's transmission. Timing advance adjustments ensure that the UE's signal arrives at the Base Station within the correct time window, reducing interference and improving overall system efficiency.

Resource Allocation: The PRACH signal carries information about the UE's requested resources for communication. This includes the frequency resources (time-frequency resources) the UE wishes to use for its uplink transmission. This information helps the network allocate suitable resources for the UE's subsequent transmissions.

Different Formats for Different Purposes: The PRACH signal may be transmitted in different formats, known as PRACH formats. These formats are optimized for different use cases, such as initial access, handovers, or system information updates. The choice of format depends on the specific communication scenario.

Thus, the PRACH signal in the 5G communication system serves as the initial contact point between the UE and the base station. The PRACH signal allows the UE to request resources for communication, synchronize with the network, and establish a connection. The contention-based random access mechanism associated with the PRACH helps manage simultaneous access attempts by multiple UEs in a fair and efficient manner.

Technical Problem with Conventional NTN Random Access Procedures

In some non-terrestrial networks, low earth orbit (LEO) communication satellites are equipped with a base station and serve as network nodes of the network. These satellites revolve around the Earth (or other body) at high-speeds. Each LEO communication satellite transmits a beam that covers a specific coverage area or circular footprint (e.g., on the Earth's surface). The coverage area of a beam in Low Earth Orbit (LEO) can vary depending on several factors, including the satellite's altitude, the frequency it operates at, and the antenna design. To explain further, the coverage area can vary from hundreds to over tens of thousands square kilometers ($km^2$). The altitude of an LEO satellite could range from about 180 kilometers to 2,000 kilometers above the Earth's surface. The higher the altitude, the larger the coverage area, but also the higher the latency. The number of cells within the coverage area of a LEO communication satellite depends on the satellite's design and the specific purpose of the satellite. In a simple scenario, a single satellite can have one beam covering its entire footprint, but in more advanced systems, a single satellite can have multiple spot beams for more focused coverage, each covering a portion of the satellite's coverage area, which may also be referred to as a cell. The radius of each cell within the satellite's coverage area depends on the satellite's altitude, frequency band, and the antenna design. Depending on the implementation, the cell radius could range from ten or less kilometers to over a hundred kilometers.

As such, a given base station mounted on a satellite has a relative short time window of setting up a communication link with a ground-based UE (e.g., terminal or device). In addition, a non-terrestrial base station on the satellite serves a very large area compared to a standard terrestrial base station. For instance, in one non-limiting implementation, the beam size may include a number of cells that collectively cover an area of 25000 to 40000 square kilometers ($km^2$), where the cells have a cell radius of about 10 kilometers or less. Due to the increased cell radius, the number of UEs (e.g., many thousands of UEs or wireless communication devices) that are active in a given coverage area increases several fold. This can result in a scenario where a very large number of UEs (e.g., many hundreds of UEs or wireless communication devices) are trying to setup an initial connection or re-establish an already existing connection to a particular base station.

A UE starts setting up a communication link with the base station when it is in the RRC IDLE, RRC INACTIVE or radio connection failed states by sending a PRACH signal to the base station as part of the MAC Random access procedure. However, the number of PRACH time and frequency occasions in the cell on which the UEs can transmit PRACH is limited. Additionally, the number of PRACH preambles that the UEs are allowed to use may be limited to 64 or less per PRACH occasion. In a standard 3GPP environment, the UEs will select a random PRACH preamble and occasion to transmit the PRACH signal. As the number of UEs in the cell increases, the probability for collisions (e.g., UEs selecting the same PRACH occasion and preamble increases).

To circumvent this problem, one approach is to increase the number of PRACH processing resources at the base station. However, the negative impact of this approach is that the base station requires a large amount of PRACH processing resources in order to handle the frequent PRACH opportunities, as well as reduced usable system bandwidth. The PRACH cell resources are an always on/always present resources that cannot be used for normal UE scheduling.

It would be desirable to provide improved random access procedures in non-terrestrial networks, such as those that include low earth orbit (LEO) satellites equipped with a base station and serve as network nodes of the network. It would also be desirable to reduce usage of hardware resources utilized at such base stations and reduce or prevent overloading of processing resources at such base stations when a large number of UEs fall within coverage regions at the same time. It would also be desirable to reduce the number of UE contentions at the base station, to increase overall cell throughput, and to serve a larger number of UEs.

In accordance with the disclosed embodiments, the base stations of the satellites and the UEs may support random access procedures that help to address problems that arise when large numbers of user equipment are located within a coverage area of a particular base station and are contending with each other to establish a connection with that particular base station. In particular, a random access procedure is disclosed that may help ensure that PRACH signals transmitted from different UEs are randomly delayed with respect to each other. Because each UE transmits its PRACH signal after its unique delay, the likelihood of PRACH signals from different UEs arriving at the particular base station at the same time can be reduced significantly. As such, the likelihood that different UEs will request for a connection with the same base station at the same time can also be significantly reduced.

In accordance with the disclosed embodiments, problems including those noted above may be alleviated by randomly delaying transmission of the PRACH signal at each UE by an arbitrary delay time. This can help uniformly distribute the random access procedure attempts by the UEs over time, which can reduce the number of PRACH occasions, preambles and resources spent on resolving contentions. As such, different UEs may request connections with the base station in accordance with different arbitrary random delay values (e.g., such that PRACH signals are transmitted at different times) to help reduce contention for a connection to the base station. This way the likelihood that the PRACH signals will arrive at the base station at the same time can also be reduced. This is true even when large numbers of UEs may be located in a relatively coverage area of the base station at any given time, and even though the base station moves at a relatively high rate of speed over the particular coverage area due to the fact that it is part of a satellite.

The disclosed embodiments may prevent overloading the PRACH processing resources at base station when a large amount of UEs fall within a beam of a base station at the same time or have a need to re-establish the UL synchronization to the base station. The disclosed embodiments can significantly reduce the number of UE contentions at the base station. This can reduce additional base station-UE messaging for resolving such contentions. The disclosed embodiments may also allow less hardware resources to be utilized at the base station to process the PRACH decoding. The disclosed embodiments may also reduce the number of PRACH time and frequency occasions. This can allow for an increased overall cell throughput and a larger number of UEs to be served.

Having given this description of a system for communication between the UE and a base station (also referred to as a network node) that can be applied within the context of the present disclosure, technologies will now be described with reference to FIGS. 1-6 for delaying transmission of PRACH signal that is used to establish a connection and communication between the UE and the satellite.

FIG. 1A is a simplified diagram illustrating a non-terrestrial network communication system 100 in which aspects of the technology may be employed. The system 100 includes multiple user equipment (UE) 110 that are in communication with each other, and a constellation of satellites 120 that are in communication with one or more of the UE 110. The constellation of satellites 120 includes a group of artificial satellites that are positioned in a number of different orbits around the Earth 140 to provide specific services or coverage. For instance, the satellites 120 may work together to offer communication, navigation, or remote sensing services to a wide geographic area on Earth. The constellation of satellites 120 may include any number of satellites to ensure global coverage and to provide redundancy in case of failure. In one embodiment, the satellites 120 may make up a 5G Non-Terrestrial Network, such as a Low Earth Orbit (LEO) constellation, and each satellite 120 includes a base station 150 that acts or serves as a network node. In some cases, the system 100 may support enhanced broadband communications, ultra-reliable (e.g., mission critical) communications, low latency communications, or communications with low-cost and low-complexity devices. It should be appreciated that such satellite constellations can be arranged in different configurations, including low Earth orbit (LEO), medium Earth orbit (MEO), or geostationary orbit (GEO), depending on the intended application and the desired level of coverage and service.

Each of the satellites 120 is an artificial object placed in orbit around a celestial body, often referring to Earth 140. Each satellite typically includes various components such as a communication or scientific payload, power systems (such as solar panels), propulsion for orbit adjustments, and communication equipment to transmit and receive data to and from Earth 140. Each satellite, e.g., the satellite 120A, may include a base station, e.g., the base station 150A, that may wirelessly communicate with UEs 110 via one or more antennas. The base stations 150 of the satellites 120 may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The base stations 150 of the satellites 120 may be of different types (e.g., macro or small cell base stations). The UEs 110 described herein may be able to communicate with various types of base stations and network equipment including macro eNBs, small cell eNBs, gNBs, relay base stations, and the like.

Each base station, such as the base station 150A of satellite 120A, may be associated with a particular geographic coverage area, for example, geographic coverage area 130A in which communications with various UEs, such as the UEs 110A and 110B is supported. For sake of simplicity, FIG. 1A shows a simplified representation that includes three geographic coverage areas 130, which may be referred to herein as a first geographic coverage area 130A, a second geographic coverage area 130B, and a third geographic coverage area 130C; however, it should be appreciated that each base station 150 includes an associated geographic coverage area. Each base station may provide communication coverage for a respective geographic coverage area via communication links 115, and communication links 115 between a base station 150 of satellite 120 and a UE 110 may utilize one or more carriers. The communication links may include upstream transmissions from the UE 110 to the base station 150 of satellite 120, or downstream transmissions from the base station 150 of satellite 120 to the UE 110. Downstream transmissions may also be called downlink or forward link transmissions while upstream transmissions may also be called uplink or reverse link transmissions.

Although not shown in FIG. 1A, each geographic coverage area 130 of a base station 150 may be divided into sectors (not shown) each making up a portion of the geographic coverage area 130, and each sector may be associated with a cell. For example, each base station may provide communication coverage for a macro cell, a small cell, a hot spot, or other types of cells, or various combinations thereof. In some examples, the base stations may be non-stationary and therefore provide communication coverage for a moving geographic coverage area 130. In some examples, different geographic coverage areas 130 associated with different technologies may overlap, and the overlapping geographic coverage areas 130 associated with different technologies may be supported by the same base station or by different base stations. The system 100 may include, for example, a heterogeneous 5G network in which different types of base stations provide coverage for various geographic coverage areas 130.

The term "cell" refers to a logical communication entity used for communication with a base station (e.g., over a carrier) or a satellite beam, and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 130 (e.g., a sector) over which the logical entity operates.

The UEs 110 may be deployed at different locations in a geographic area 130 that includes, for example, a forest, an agricultural land, or the like. In one embodiment, for example, the UEs 110 are positioned at the different locations in certain geographic area 130 to provide sensor coverage over part of or substantially all of the area. The UEs 110 may also be referred to as a mobile device, a wireless device, a remote device, a handheld device, or a subscriber device, or some other suitable terminology, where the "device" may also be referred to as a unit, a station, a terminal, or a client. The UE 110 may also be a personal electronic device such as a cellular phone, a personal digital assistant (PDA), a tablet computer, a laptop computer, or a personal computer. In some examples, the UE 110 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In an embodiment, some or all of the UEs 110 may be implemented as MTC or IoT devices, which may be low cost or low complexity devices, and may provide for automated communication between machines (e.g., via Machine-to-Machine (M2M) communication). M2M communication or MTC may refer to data communication technologies that allow devices to communicate with one another or a base station of a satellite without human intervention. In some examples, M2M communication or MTC may include communications from devices that integrate sensors or meters to measure or capture information and relay that information to a central server or application program that can make use of the information or present the information to humans interacting with the program or application. The UEs 110 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The UEs 110 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for the UEs 110 include entering a power saving "deep sleep" mode when not engaging in active communications, or operating over a limited bandwidth (e.g., according to narrowband communications). In some cases, the UEs 110 may be designed to support critical functions (e.g., mission critical functions), and the system 100 may be configured to provide ultra-reliable communications for these functions.

In some embodiments, a UE, such as the UE 110A may also be able to communicate directly with other UEs, such as the UE 110B (e.g., using a peer-to-peer (P2P) or device-to-device (D2D) protocol). One or more of a group of UEs 110 utilizing D2D communications may be within the geographic coverage area 130 of a base station, such as the geographic coverage area 130A of base station 150 of satellite 120A. Other UEs 110 in such a group may be outside the geographic coverage area 130A of the base station 150 of satellite 120A or be otherwise unable to receive transmissions from the base station 150 of satellite 120A. In some cases, groups of UEs 110 communicating via D2D communications may utilize a one-to-many (1: M) system in which each UE 110 transmits to every other UE 110 in the group. In some cases, a base station facilitates the scheduling of resources for D2D communications. In other cases, D2D communications are carried out between UEs 110 without the involvement of a base station.

In some embodiments, the UEs 110 and the satellites 120 that make up the constellation are designed so that they are capable of non-line-of-sight (NLOS) communications with one another. When communication devices, such as the UEs 110 and based stations implemented at satellites 120, are capable of NLOS communication, the device can establish communication links 115 even when there are obstacles or obstructions between the transmitter and the receiver. In traditional line-of-sight communication, a clear and unobstructed path is needed between the transmitting and receiving antennas for reliable signal transmission. By contrast, NLOS communication allows signals to propagate and reach the receiver even if there are buildings, trees, terrain features, or other obstacles in the way. NLOS communication is particularly important, for example, in urban environments, dense foliage, indoor settings, and situations where direct line-of-sight paths are blocked.

The system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 110 located indoors or under some obstruction or blockage. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The system 100 may further operate in a super high frequency (SHF) region using frequency bands from 3 GHZ to 30 GHz, also known as the centimeter band. The SHF region includes bands such as the 5 GHz industrial, scientific, and medical (ISM) bands, which may be used opportunistically by devices that can tolerate interference from other users.

The system 100 may further operate in an extremely high frequency (EHF) region of the spectrum (e.g., from 30 GHz to 300 GHZ), also known as the millimeter band. In some examples, the system 100 may support millimeter wave (mmW) communications between UEs 110 and base stations of satellites 120, and EHF antennas of the respective devices may be even smaller and more closely spaced than UHF antennas. In some cases, this may facilitate use of antenna arrays within a UE 110. However, the propagation of EHF transmissions may be subject to even greater atmospheric attenuation and shorter range than SHF or UHF transmissions. Techniques disclosed may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHZ ISM band. When operating in unlicensed radio frequency spectrum bands, wireless devices such as base stations 150 of satellites 120 and UEs 110 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downstream transmissions, upstream transmissions, peer-to-peer transmissions, or a combination of these. Duplexing in unlicensed spectrum may be based on frequency division duplexing (FDD), time division duplexing (TDD), or a combination of both.

In some examples, the base stations 150 and/or UEs 110 may be equipped with multiple antennas, which may be used to employ techniques such as transmit diversity, receive diversity, multiple-input multiple-output (MIMO) communications, or beamforming. For example, the system 100 may utilize a transmission scheme between a transmitting device (e.g., a base station 150 or a UE 110) and a receiving device (e.g., a UE 110 or a base station 150), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

User Equipment

Figure 2:
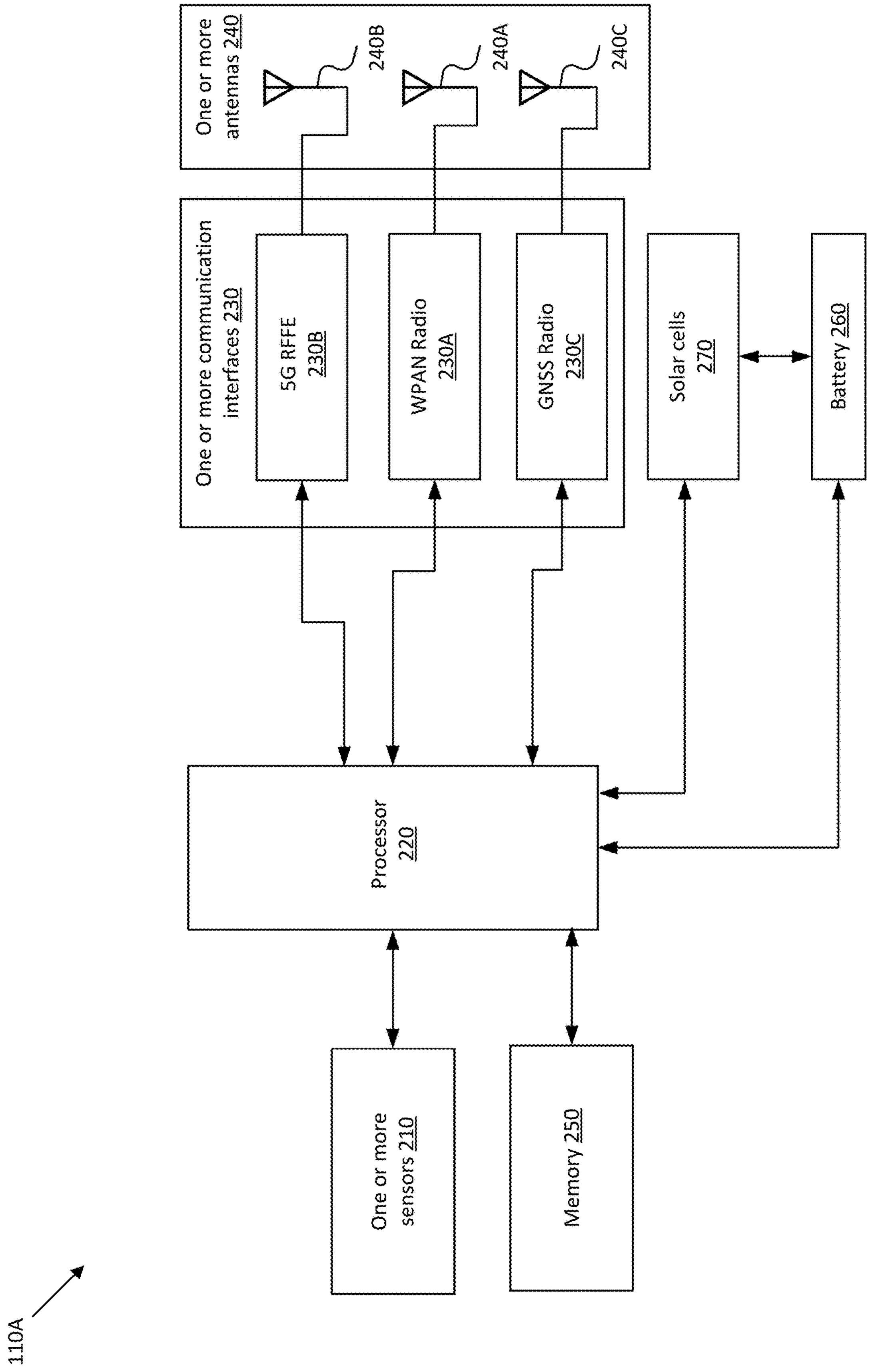
FIG. 2 is a block diagram of an exemplary user equipment (UE) in which aspects of the technology may be employed.

As shown in FIG. 2, each of the UE 110, for example, a first UE 110A, may include one or more sensors 210, a processor 220, one or more communication interfaces 230, one or more antennas 240, and a memory 250 coupled to the processor 220. The one or more sensors 210 may be configured to measure a physical parameter. The processor 220 and the memory 250 are configured to determine a delay value based on a set of attributes associated with the UE 110, generate a Physical Random Access Channel (PRACH) signal, and delay transmission of the PRACH signal to the network node, i.e., the base station of the satellite 120A, of a non-terrestrial network based on the delay value. The one or more communication interfaces 230 are coupled to one or more antennas 240. As will be described below, the communication interfaces 230 in conjunction with the antennas 240 are configured to communicate the PRACH signal when a time period corresponding to the delay value has lapsed. As used herein, the term "period" or "time period" may refer to a time interval or a duration of time. Each of the UEs 110 is configured to establish communication with at least one of the satellites 120 to transmit corresponding PRACH signal.

The UEs 110 may include one or more antennas 240A configured to facilitate communication with other ones of UEs 110, and one or more antennas 240B configured to facilitate communication with the satellites 120. In one embodiment, the one or more antennas 240A are coupled with a wireless personal area network (WPAN) radio 230A (i.e., a first communication interface of the one or more communication interfaces 230) that is configured to facilitate wireless connectivity with the other ones of the UEs 110 by way of the one or more antennas 240A. In one example, the WPAN radio 230A may be a Bluetooth Low Energy (BLE) Radio configured to communicate with the other ones of the UEs 110 via Bluetooth. The one or more antennas 240B are coupled with a 5th Generation (5G) radio frequency front end (RFFE) radio 230B (i.e., a second communication interface of the one or more communication interfaces 230) that is configured to facilitate wireless connectivity between the UEs 110 and the satellites 120 by way of the one or more antennas 240B.

The UEs 110 may further include one or more antennas 240C configured to facilitate communication with global navigation satellite system (GNSS). In one embodiment, the one or more antennas 240C are coupled with a GNSS radio 230C (i.e., a third communication interface of the one or more communication interfaces 230) that is configured to provide wireless connectivity with the GNSS the UEs 110 by way of the one or more antennas 240A. The GNSS radio 230C is configured to receive the signals from the satellites of the GNSS via the one or more antennas 240C to determine the location of the UEs 110. The UEs 110 may include at least one battery 260, and solar cells 270 configured to receive light and charge the at least one battery 260.

Satellites

Each of the satellites 120 may be a communications satellite that includes at least one base station 150. The base station 150 on the satellite 120 is an important component of the satellite communication systems, serving as an access point for two-way data transmission between Earth-based UEs 110 and the satellites 120 as well as between two or more of the satellites 120. The base station 150 may be housed within (or as part of) the satellite's payload and may include transceivers and antennas designed to facilitate seamless communication across vast distances. The base station 150 plays a role in relaying, amplifying, and routing signals between terrestrial devices, such as the UEs 110, and the satellites 120, ensuring robust and efficient data transfer. The base stations 150 are often equipped with advanced signal processing capabilities, enabling functions like modulation, demodulation, encoding, and decoding to optimize the quality and reliability of communication links 115, and can be important for various satellite-based services, including global broadband internet, broadcasting, navigation, and Earth observation.

In one implementation, each satellite 120 may be a 5G Non-Terrestrial Network (NTN) satellite, in which case the base station 150 may be referred to as a “gNodeB.” In this context, a gNodeB may refer to a 3GPP-compliant implementation of the 5G base station. The gNodeB includes independent network functions, which implement 3GPP-compliant new radio (NR) radio access network (RAN) protocols namely. One non-limiting example of a base station will now be described with reference to FIG. 1B.

Figure 1B:
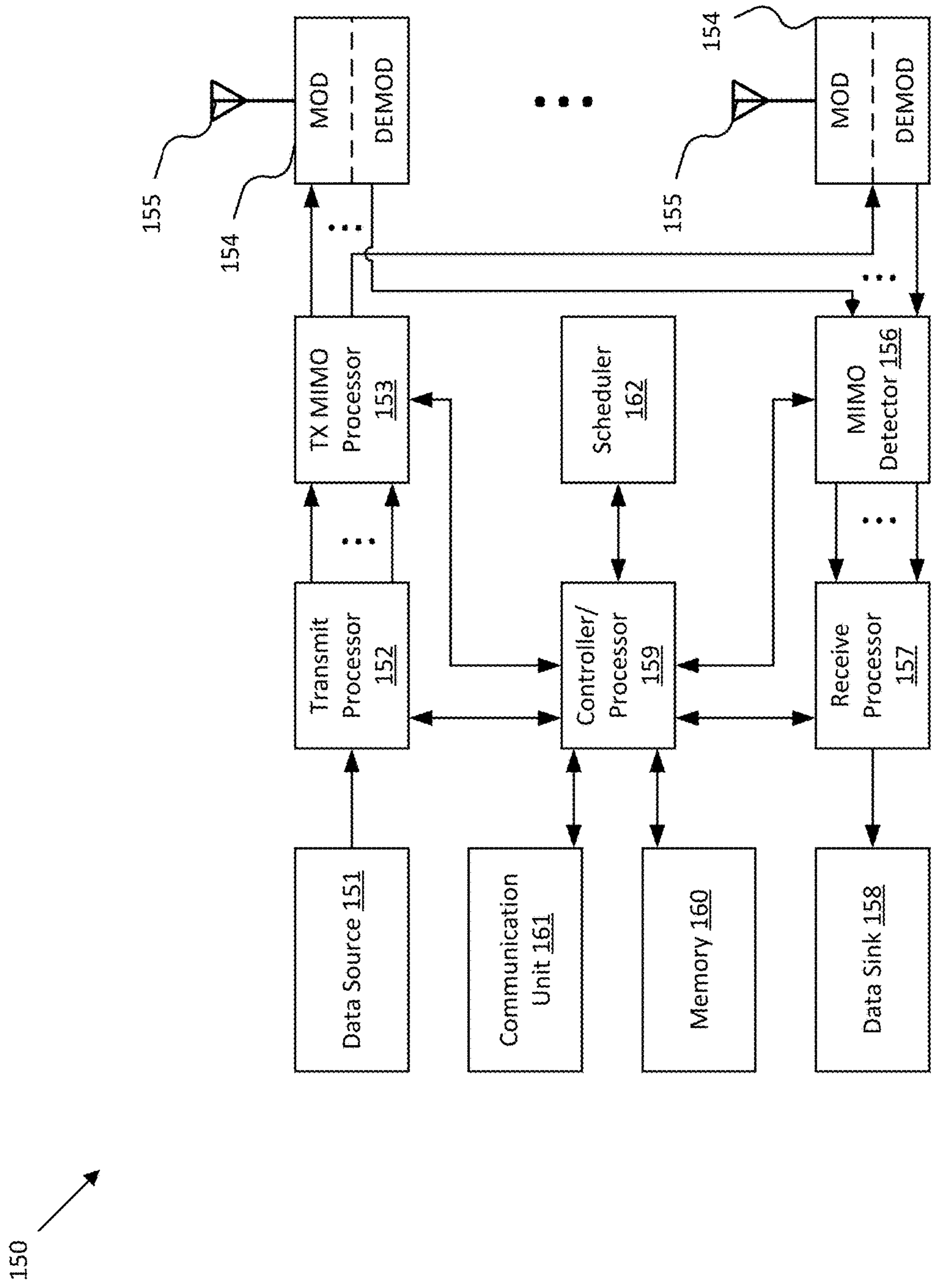
FIG. 1B is a block diagram of an exemplary base station in which aspects of the technology may be employed.

FIG. 1B is a block diagram of an exemplary base station 150 in which aspects of the technology may be employed, where “exemplary” means one non-limiting example. In some embodiments, such as that illustrated, the base station 150 may be equipped with multiple antennas 155.

At the base station 150, a transmit processor 152 may receive data from a data source 151 for one or more UEs 110, select one or more modulation and coding schemes (MCS) for each UE based at least in part on channel quality indicators (CQIs) received from the UE 110, process (e.g., encode and modulate) the data for each UE based at least in part on the MCS(s) selected for the UE 100, and provide data symbols for UEs 110. The transmit processor 152 may further process system information (e.g., for semi-static resource partitioning information (SRPI) and/or the like) and control information (e.g., CQI requests, grants, upper layer signaling, and/or the like) and provide overhead symbols and control symbols. The transmit processor 152 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 153 may perform spatial processing (e.g., precoding) on the data symbols, the control symbols, the overhead symbols, and/or the reference symbols, if applicable, and may provide T output symbol streams to T modulators (MODs) 154. Each modulator 154 may process a respective output symbol stream (e.g., for OFDM and/or the like) to obtain an output sample stream. Each modulator 154 may further process (e.g., convert to analog, amplify, filter, and upconvert) the output sample stream to obtain a downlink signal. T downlink signals from modulators 153 may be transmitted via the antennas 155. According to various aspects described in more detail below, the synchronization signals may be generated with location encoding to convey additional information.

At UE 110, antennas may receive the downlink signals from base station 150 and/or other base stations and may provide received signals to demodulators (DEMODs) 154. Each demodulator 154 may condition (e.g., filter, amplify, downconvert, and digitize) a received signal to obtain input samples. Each demodulator 154 may further process the input samples (e.g., for OFDM and/or the like) to obtain received symbols. A MIMO detector 156 may obtain received symbols from the demodulators 154, perform MIMO detection on the received symbols if applicable, and provide detected symbols. A receive processor 157 may process (e.g., demodulate and decode) the detected symbols, provide decoded data for the UE 110 to a data sink 158, and provide decoded control information and system information to a controller/processor 159. A channel processor may determine reference signal received power (RSRP), received signal strength indicator (RSSI), reference signal received quality (RSRQ), channel quality indicator (CQI), and/or the like.

On the uplink, at UE 110, the UE 110 may receive and process data from a data source (not shown) and control information (e.g., for reports comprising RSRP, RSSI, RSRQ, CQI, and/or the like). The UE 110 may also generate reference symbols for one or more reference signals. The symbols generated may be precoded if applicable, further processed by modulators (not shown) of the UE 110 (e.g., for DFT-s-OFDM, CP-OFDM, and/or the like), and transmitted to base station 150. At base station 150, the uplink signals from UE 110 and other UEs may be received by antennas 155, processed by demodulators 154, detected by a MIMO detector 156 if applicable, and further processed by a receive processor 157 to obtain decoded data and control information sent by UE 110. The receive processor 157 may provide the decoded data to a data sink 158 and the decoded control information to the controller/processor 159. The base station 150 may include a communication unit 161 and communicate to the UEs 110.

The controller/processor 159 of base station 150 and/or any other component(s) of FIG. 1B may perform one or more techniques associated with random access procedures, as described in more detail elsewhere. For example, the controller/processor 159 of base station 150 and/or any other component(s) of FIG. 2 may perform or direct operations of, for example, the method 1200, 1300 of FIGS. 12 and 13 and/or other processes as described. The memory 160 may store data and program codes for base station 150. For example, the memory 160 may store the RACH timing manager (not shown). A scheduler 161 may schedule UEs for data transmission on the downlink and/or uplink.

In some aspects, the UE 110 may include means for receiving, means for transmitting, means for starting, and means for entering a sleep state, means for skipping one RACH occasion. The base station 150 can include means for receiving, means for transmitting, means for scheduling, and means for grouping. Such means may include one or more components of the UE 110 or base station 150 described in connection with FIG. 1B.

As described above, each base station 150 may include an antenna system that is capable of communicating with UEs 110. In some embodiments, each antenna system may be implemented as an array antenna system. Antenna arrays, including phased array antenna systems, can dynamically adjust their radiation patterns to focus energy in a desired direction, enhancing the chances of non-line-of-sight (NLOS) communication. Phased array antenna systems are known for their adaptability, as they can dynamically adjust their beam patterns without mechanical movement. This flexibility is especially valuable for satellites in NTN configurations, where efficient communication with multiple ground-based stations and user equipment may be important as the satellite orbits the Earth. Additionally, lower-frequency signals tend to diffract and penetrate obstacles more effectively than higher-frequency signals. Further, when the wavelength of the signal is comparable to the size of the obstacle signals can bend or diffract around obstacles.

In some embodiments, each antenna system may be implemented as a phased array antenna system. One non-limiting example of a phased array antenna system will now be described with reference to FIG. 1C, which is a block diagram of an exemplary phased array antenna system in which aspects of the technology may be employed. The phased array antenna system 170 may also be referred to as electronically steerable or scanned array, which may be used in any of the embodiments disclosed herein.

A phased array refers to an array of radiators forming a main beam, wherein the direction of the main beam is electronically steerable by changing the phase/time delay of the RF energy arriving at each of the radiators. For simplicity, the illustration shows a linear array, but for the disclosed embodiments it is more beneficial to utilize a two-dimensional array, such that the beam can be steered in two dimensions. The array comprises radiating elements 175, each connected to a phase shifter 180. Each of the phase shifters 180 may be in the form of a delay line. The phase shifters 180 are controlled by a computer C to introduce a certain amount of delay in the corresponding transmission lines and thereby steer the beam from boresight by an angle θ.

The transmitter TX generates the signal, which is applied to a corporate feed 185, which splits the signal to be delivered to each of the radiating elements 175. Prior to reaching the radiating element, the signal from the feed passes through the corresponding phase shifter 180 such that the phase of the signal in each delay line is changed by an individual amount to cause the beam to steer. The phase shifters 180 can also be controlled by an on-chip processor or baseband processor. The range of each phase shifter can be quantized into a look-up table (LUT). The beam can be steered by quickly retrieving a phase value from the memory. The reverse happens for reception.

Figure 1C:
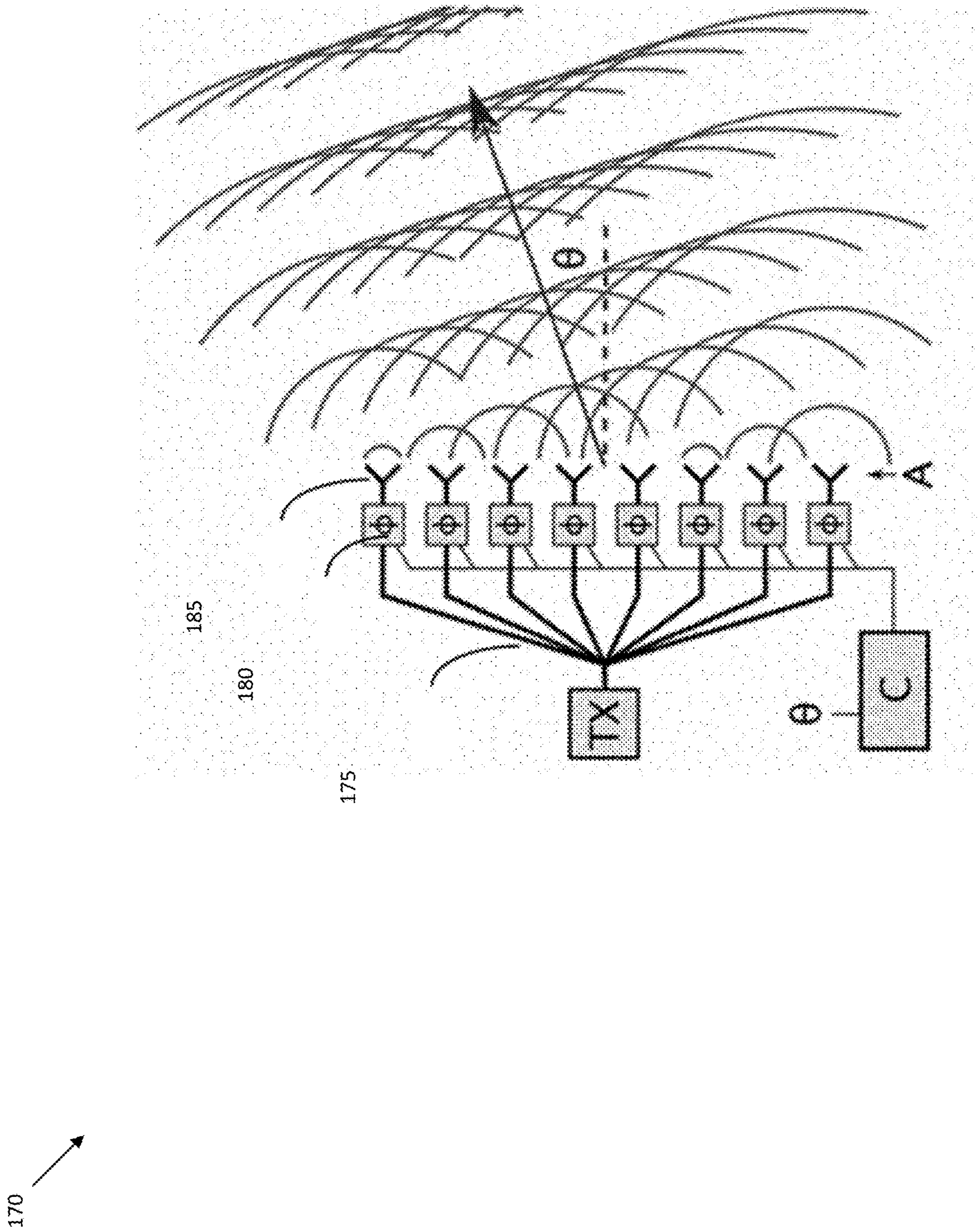
FIG. 1C is a block diagram of an exemplary phased array antenna system in which aspects of the technology may be employed.

The example illustrated in FIG. 1C is a passive phased array or passive electronically scanned array (PESA), which is a phased array in which the antenna elements are connected to a single transmitter and/or receiver. However, the disclosed embodiments are not limited to PESA, but rather encompass any electronically steerable antenna. For example, an active phased array or active electronically scanned array (AESA) may also be used. AESA is a phased array in which each antenna element has an analog transmitter/receiver (T/R) module which creates the phase shifting to electronically steer the antenna beam. Any of the disclosed embodiments may also be implemented using a digital beam forming (DBF) phased array, which has a digital receiver/exciter at each element in the array. The signal at each element is digitized by the receiver/exciter, so that antenna beams can be formed digitally in a field programmable gate array (FPGA) or the array computer. This approach allows for multiple simultaneous antenna beams to be formed, e.g., by grouping the radiating elements into sub-groups.

In general, it should be appreciated that each antenna may be any electronically steerable antenna having plurality of radiators, such as the phased array antenna similar to the example illustrated in FIG. 1C. For simplicity, the disclosure provided herein uses the term "phased array antenna", but it should be appreciated that the term encompasses any electronically steerable antenna having plurality of radiators forming a radiation pattern the direction of which can be steered electronically.

Referring again to FIG. 1A, when the antenna system of each base station 150 is implemented as a phased array antenna system, each phased array antenna system may dynamically steer beams and provide coverage to different locations as the satellite 120 moves across the sky. Stated differently, each phased array antenna system can dynamically steer and shape the radiation pattern of the antenna, making it an important component for establishing efficient and reliable communication links between satellites 120 and ground-based stations and user devices, such as the UEs 110.

Each phased array antenna system may be capable of both transmitting and receiving signals, and may be designed to provide directional control over the transmitted and received electromagnetic signals. For example, when transmitting, each phased array antenna system may be configured to generate a beam of radio waves. In this context, a beam refers to a focused or directed signal that is transmitted from the satellite's antenna to a specific area on the Earth's surface. The satellite's antenna system is designed to concentrate the signal's energy into a narrow region, effectively creating a "beam" of communication that covers a targeted geographic area. In other words, a beam may refer to the directed path of radio waves that target specific areas on the Earth's surface to provide communication services, where a radio wave can refer to a specific type of electromagnetic wave that carries a communication signal with a particular frequency and wavelength. The radio wave includes both the carrier frequency and the modulated information, such as voice, data, or video.

Each phased array antenna system adjusts the phase and amplitude of individual antenna elements to create a focused and directed beam of electromagnetic waves. By carefully controlling the phase relationships of the signals emitted from each element, the antenna can steer the beam's direction without physically moving the entire antenna structure. This directed beam allows the satellite to target specific areas on the Earth's surface for communication.

By contrast, when the phased array antenna system is in receiving mode, it utilizes the same principles of phase and amplitude control to selectively receive signals from a particular direction. The received signals are then combined coherently to enhance the sensitivity of the antenna in that specific direction. This directional receiving capability is useful for efficiently capturing signals from the desired sources while reducing or minimizing interference from other directions.

Each base station 150 may be configured to transmit information to one or more UEs 110 for determining a delay value based on a set of attributes associated with the UEs 110 and receive the PRACH signal from at least one of the UEs 110 processible by the base station (e.g., the network node) of the satellite 120 to establish a connection between the UE 110 and the satellite 120.

In an exemplary embodiment of the present disclosure, each antenna 240B of each of the UEs 110 is configured to communicate directly with at least one phased array antenna system of at least one of the plurality of satellites 120.

In an exemplary embodiment of the present disclosure, as illustrated in FIG. 1A, the UEs 110 are configured to communicate with each other and exchange data when in range of each other. This allows for the UEs 110 to be configured as a mesh network so that the UEs 110 can communicate information with each other.

In an exemplary embodiment, each base station may transmit information to the UEs 110 in its coverage area, and the information may be used by each of the receiving UEs 110 for determining a delay value for that particular UE based on a set of attributes associated with that particular UE 110. For example, consider an example, where the base station 150A may transmit a configuration message to the UE 110A.

In one implementation, the configuration message may be transmitted, for example, as part of a system information block 1 (SIB1). The configuration message may include a set of parameters comprising at least one of: a set of PRACH time-frequency resources, a PRACH Preamble format, a set of PRACH preamble sequences, and a delay parameter.

When the UE 110A receives the configuration message from the base station 150A, the UE 110A may decode the configuration message to obtain the delay parameter. 3GPP standard defines that PRACH transmission can start once the SIB1 has been received, although there is no minimum time defined within which the UE 110 has to transmit the PRACH signal. In some embodiments, the delay parameter is a bit encoded field, e.g., "PRACH-DelayFunction", in the configuration message which indicates to one of enable and disable delaying the transmission of a PRACH signal. In some examples, if the bit encoded field is activated (or true), the delaying of the transmission of the PRACH signal is enabled and if the bit encoded field is deactivated (or false), the delaying of the transmission of the PRACH signal is disabled.

Further, the UE 110A may determine a delay value based on the delay parameter and the set of attributes associated with UE 110A. The set of attributes includes at least one attribute uniquely identifying the UE 110A, such as an International Mobile Subscriber Identity (IMSI) number, a Radio Network Temporary Identifier (RNTI), and an International Mobile Equipment Identity (IMEI). Each UE has a unique IMSI number and may have a UE (terminal) specific RNTI of the gNodeB out of previous RRC Connected State session. It will be apparent to a person skilled in the art that although in the current embodiment, the set of attributes includes at least one of: the IMSI number, the RNTI, and the IMEI, in various other embodiment, the set of attributes may include any suitable attribute which uniquely identifies each UE 110A, without deviating from the scope of the present disclosure. For example, in some cases, when a UE 110, such as UE 110A, has already established a connection with the base station 150A of satellite 120A previously, and is again trying to establish a connection, the set of attributes may be attributes from the previous session between the UE 110A and the base station 150*a* of satellite 120A.

If multiple UEs, such as the UE 110A and UE 110B, which are under a coverage area, such as the coverage area 130A, of a satellite, such as the satellite 120A, generate and transmit the PRACH signals to the base station 150A of the satellite 120A, the PRACH signals transmitted by both the UEs 110A and 110B may collide and both the UEs 110A and 110B might not be able to establish a connection with the satellite 120A and need to try establishing a connection again by sending the PRACH signals. In one scenario, there might be a large number of UEs 110 that may be under the coverage area 130 of a satellite and some or all may be sending PRACH signals to the satellite 120 for establishing a connection with the satellite 120. In this scenario, as the number of PRACH time and frequency occasions in the cell on which the UEs 110 can transmit PRACH signal is limited, the probability for collisions (e.g., multiple UEs selecting the same PRACH occasion and preamble increases.

To circumvent this problem, each UE, such as the UE 110A, generates the PRACH signal and delays transmission of the PRACH signal to the base station 150A of the satellite 120 based on a delay value or parameter that is uniquely computed for that UE 110A based on information that is unique to that UE 110A to introduce an arbitrary random delay in the transmission of the PRACH signal from that UE 110A. Because each UE transmits its PRACH signal with different, arbitrary random delay values this greatly increases the likelihood that such PRACH signals are transmitted at different times and that they arrive at the base station at different times. In turn, this helps ensure that different UEs establish their connection with (or to) the base station at different times (e.g., that the base station does not receive multiple PRACH signals at the same time).

In one embodiment, each UE delays the transmission of its PRACH signal by a time period that is unique to that particular UE. For example, in some embodiments, the UE 110A delays the transmission of the PRACH signal for a time period corresponding to a first delay value that is determined (e.g., computed) based on information that is unique to UE 110A, whereas the UE 110B delays the transmission of the PRACH signal for a different time period corresponding to a second delay value that is determined (e.g., computed) based on information that is unique to UE 110A. The first delay value can be determined (e.g., computed) based on information that is unique to UE 110A, such as, a an IMEI, an IMSI, a UE RNTI from a previous session, or a combination thereof. By contrast, the second delay value can be determined (e.g., computed) based on information that is unique to UE 110B, such as, an IMEI, an IMSI, a UE RNTI from a previous session, or a combination thereof. As a result, because the first delay value and the second delay value are different, the UEs 110A, 110B will transmit their respective PRACH signals with different delays at different times.

For instance, after the time period corresponding to first delay value has lapsed, the UE 110A transmits its PRACH signal to a base station (e.g., base station 150A). Likewise, after the time period corresponding to the second delay value has lapsed, the UE 110B transmits its PRACH signal to a base station. Because each UE 110 transmits its PRACH signal after its unique delay, the likelihood of PRACH signals from different UEs arriving at the base station at the same time can be reduced significantly. As such, the likelihood that different UEs will request for a connection with the same base station at the same time can also be significantly reduced.

In some embodiments, the UE 110 may initiate transmission of the PRACH signal to the base station 150 of the satellite 120, for example, when the UE 110 is in one of: an idle state, an inactive state, and a connection failed state. To explain further, in one embodiment, the Radio Resource Control (RRC) is a layer within the 5G NR protocol stack. RRC exists in the control plane of the UE 110 and the base station 150. The behavior and functions of RRC are governed by the current state of RRC. In 5G NR, RRC has three distinct states: RRC_IDLE, RRC_CONNECTED and RRC_INACTIVE. Upon power ON, the UE 110 enters into RRC_IDLE mode which corresponds to the idle state of the UE 110. The UE 110 may move to RRC_IDLE mode from either RRC_CONNECTED mode or RRC_INACTIVE mode. Further, the UE 110 moves to RRC_INACTIVE mode from RRC_CONNECTED mode. The UE 110 is connected but in an inactive mode corresponding to the inactive state of the UE 110. In RRC_INACTIVE mode the UE 110 maintains RRC connection and at the same time reduces/minimizes signaling and power consumption. The UE 110 remains in connection with the 5G-RAN/5GC in the RRC_CONNECTED mode. In some case, if the connection between the UE 110 and the satellite 120 fails, the UE 110 may be in a mode corresponding to the connection failed state of the UE 110.

In some embodiments, the delay value is an arbitrary random delay which is a pseudorandom binary sequence associated with the UE 110. The UE 110 determines the delay value by scrambling at least one of the set of attributes, for example, the IMEI, the IMSI or the RNTI, by a pseudorandom binary sequence to generate a scrambled sequence and compute a modulo operation on the scrambled sequence to generate the delay value. The pseudorandom binary sequences may be generated using linear-feedback shift registers. With a suitable polynomial and a unique incoming number, such as the IMEI, the IMSI or the RNTI, the output bitstream is close to random. The output bitstream is translated into a random number that is mapped by the mod function into a random number in the space of the mod function.

In some cases, when the RNTI is available, the UE 110 scrambles a binary representation of the RNTI to generate the scrambled sequence. Further, when the RNTI is unavailable, the UE 110 scrambles the IMSI number or IMEI number. It will be understood by a person skilled in the art that in an alternate embodiment, any combination of the IMEI number, the IMSI number and the RNTI may be utilized to form a combination which may be scrambled by the UE 110 to generate the scrambled sequence. In some examples, the scrambled sequence with integer representation of "m" undergoes a modulo n (where n is an amount of PRACH occasions within 10.24 seconds) operation such that a trigger delay time, i.e., the delay value, in seconds is calculated. As a result, given the trigger delay time "m mod n" and having the function of IMSI and RNTI based triggered PRACH delay being enabled, a given UE 110 starts transmission of the PRACH signal not prior to "m mod n" seconds.

In some aspects of the present disclosure, the satellite 120 transmits information to each of a plurality of UEs 110 for determining a corresponding delay value based on a corresponding set of attributes associated with a respective UE of the plurality of UEs 110. The corresponding delay value is determined based on the corresponding delay parameter and a set of attributes associated with the respective UE. The set of attributes comprises at least one attribute uniquely identifying the respective UE of the plurality of UEs 110. In some cases, the satellite 120 transmits a plurality of configuration messages to the plurality of UEs 110. Each of the plurality of configuration messages is decoded by the respective UE to obtain a corresponding delay parameter based on which the delay value is determined by the respective UE. Further, the satellite 120 receives a plurality of PRACH signals. Transmission of each of the plurality of PRACH signals by the respective UE to the satellite 120 is delayed based on the corresponding delay value. Each PRACH signal is processible by the satellite 120 to establish a connection between the respective UE and the satellite 120.

In some embodiments, the satellite 120A receives a first PRACH signal of the plurality of PRACH signals from a first UE 110A of the plurality of UEs 110 after a first time period corresponding to the corresponding delay value has lapsed. The first PRACH signal is processible by the satellite 120A to establish a first connection between the first UE 110A and the satellite 120A. Further, the satellite 120A receives a second PRACH signal of the plurality of PRACH signals from a second UE 110B of the plurality of UEs 110 after a second time period corresponding to the corresponding delay value has lapsed. The second PRACH signal is processible by the satellite 120A to establish a second connection between the second UE 110B and the satellite 120A.

The system 100 thus prevents overloading the PRACH processing resources at the base station 150 when a large number of UEs 110 are within a coverage area (or region) the beam of the base station 150 at the same time or have the need to re-establish the uplink synchronization to the base station 150. The system 100 significantly reduces a number of UE collisions at the base station 150, therefore saving additional gNB-UE messaging for resolving the UE collisions. The system 100 allows to utilize less hardware resources at the base station 150 to process the PRACH decoding and reduces a number of PRACH time and frequency occasions, allowing for an increased overall cell throughput and a larger number of UEs that may be served.

The development of random access procedures for Non-Terrestrial Networks represents a significant technological advancement to optimize resource utilization, help to minimize collisions, adapt to dynamic network conditions, and ensure fairness in access for different users. Thus, enhancing the efficiency and reliability of NTN communication along with seamless global connectivity, remote sensing capabilities, and emergency communication services in areas where terrestrial networks fall short.

Figure 3:
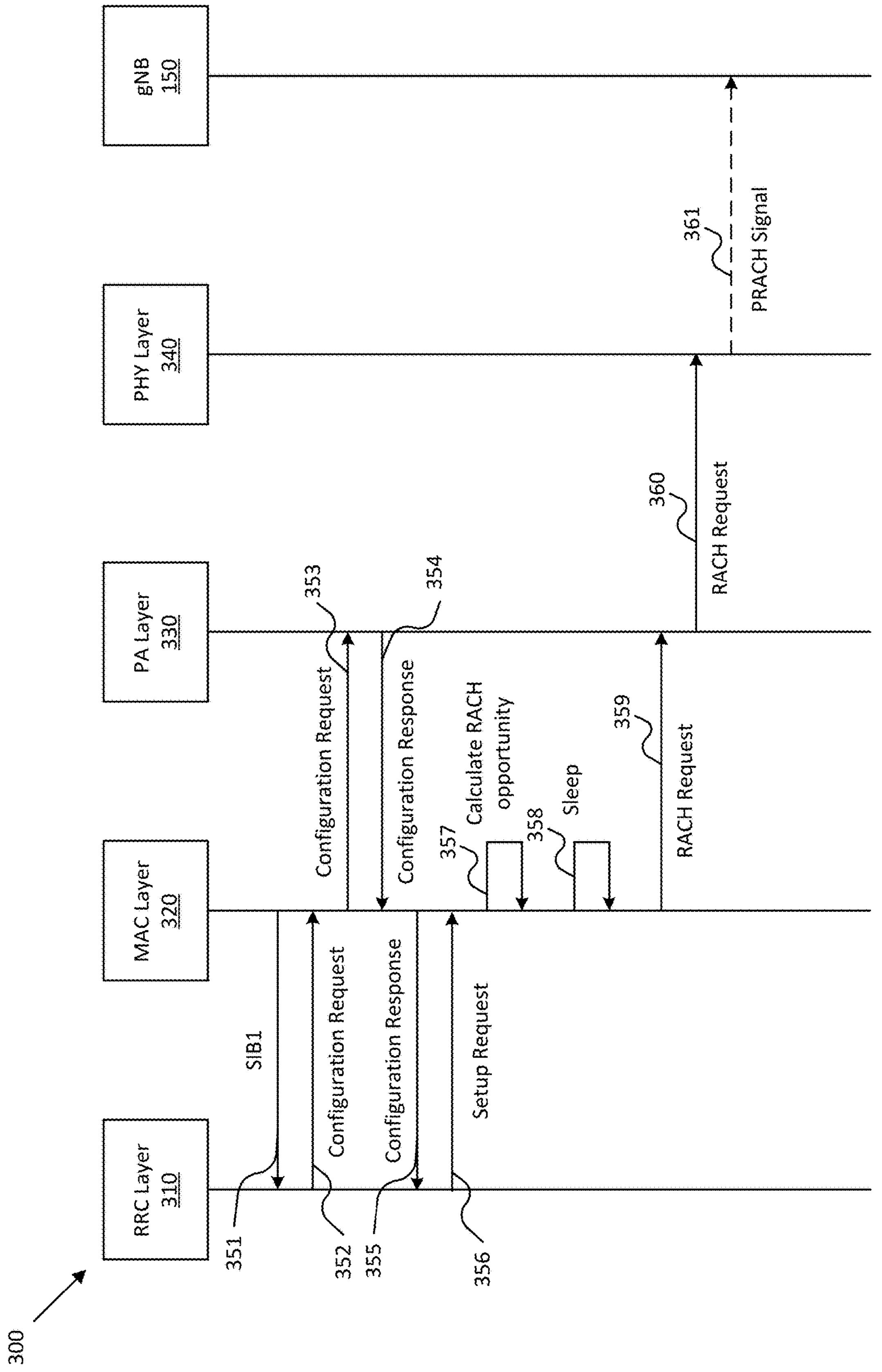
FIG. 3 is a process flow diagram illustrating one example of a Physical Random Access Channel (PRACH) procedure according to aspects of the disclosed technology.

FIG. 3 is a process flow diagram illustrating one example of a PRACH procedure 300 according to aspects of the disclosed technology. FIG. 3 illustrates the UE 110 includes elements of a protocol stack in a radio interface protocol architecture between a UE and an NTN, for example, a radio resource control (RRC) layer 310, a media access control (MAC) layer 320, a preamble and access (PA) 330 layer, and a physical (PHY) layer 340.

The PHY layer 340 at Layer 1 (L1) provides information transfer service to its higher layer, the MAC layer 320. The PHY layer 340 is connected to the MAC layer 320 via transport channels. The transport channels deliver data between the MAC layer 320 and the PHY layer 340. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL). The PA layer 330 provides an interface between the PHY layer 340 and the MAC layer 320.

The MAC layer 320 at Layer 2 (L2) provides service to its higher layer, the RRC layer via logical channels. The RRC layer 310 at the lowest part of Layer 3 (or L3) is defined on the control plane. The RRC layer 310 controls logical channels, transport channels, and physical channels in relation to configuration, reconfiguration, and release of radio bearers. A radio bearer refers to a service provided at L2, for data transmission between the UE 110A and the base station 150A of the satellite 120A. For this purpose, the RRC layers of the UE 110 and the base station 150A exchange RRC messages with each other. If an RRC connection is established between the UE 110A and the base station 150A, the UE 110A is in RRC Connected mode and otherwise, the UE 110A is in RRC Idle mode.

The base station 150 transmits the SIB1 generated by the satellite 120A to the UE 110A. At 351, the RRC layer 310 receives the SIB1 from the MAC layer 320. Upon receiving the SIB1, the RRC layer 310 decodes the SIB1 message to obtain the delay parameter and configuration information. Based on the received delay parameter, the RRC layer 310 generate the delay value using at least one attribute associated with the UE 110, such as the IMEI, the IMSI or the RNTI, or any combination thereof. The RRC layer 310 interacts with the MAC layer 320 to initiate the PRACH procedure. The RRC layer 310 may do so in response to a user action (e.g., initiating a call or requesting data) or based on network-specific requirements (e.g., handovers or re-establishing a connection), i.e., in response to receiving the SIB1. At 352, the RRC layer 310 generates and transmits a configuration request including the delay value and the configuration information as attributes to the MAC layer 320. The RRC layer 310 manages the overall PRACH procedure and determines when to start, pause, or abort the PRACH attempt based on network conditions and requirements.

At 353, the MAC layer 320 transmits the configuration request including the configuration information as the attribute to the PA layer 330. Further, the MAC layer 320 stores the delay value to prevent triggering the PRACH signal until the time period corresponding to the delay value has lapsed. The MAC layer 320 is responsible for configuring the PRACH procedure and decides a frequency of the UE 110 attempting PRACH access, the preamble format to be used, and a number of preambles to send in a single attempt.

In response to receiving the configuration request from the MAC layer 320, at 354, the PA layer 330 transmits a configuration response to the MAC layer 320. The PA layer 330 is responsible for selecting a specific preamble from a set of predefined preambles. The set of predefined preambles are sequences of symbols with unique patterns used to initiate the random access procedure. The PA layer 330 may configure parameters related to the preamble selection process, such as the maximum number of allowed preamble attempts, preamble format, and power level. These configurations ensure that the UE's random access procedure aligns with the network's requirements.

At 355, the MAC layer 320 transmits the configuration response to the RRC layer 310. In response to the reception of the configuration response, at 356, the RRC layer 310 generates a connection setup request to establish a connection between the UE 110 and the satellite 120 and transmits the connection setup request to the MAC layer 320.

At 356, the selected preamble by the PA layer 330 is sent to the MAC layer 320 for further processing. The MAC layer 320 is responsible for scheduling the transmission of the preamble. At 357, the MAC layer 320 calculates RACH opportunity based on the configuration information and the delay value which indicates time and frequency occasions when the UE 110 may send the PRACH signal to the satellite 120. Based on the calculated RACH opportunity that is the time to send the PRACH signal to the satellite 120, at 358, the MAC layer 320 goes into sleep mode until either the time the RACH opportunity lapses or the time period corresponding to the delay value lapses.

When the time till the RACH opportunity lapses or the time period corresponding to the delay value lapses, at 359, the MAC layer 320 transmits a RACH request along with the selected preamble as attribute. Once the UE 110 has selected a preamble, the PA layer 330 schedules the transmission of the preamble. The PA layer 330 coordinates with the MAC layer 320 to ensure that the selected preamble is transmitted at the appropriate time, considering contention resolution and access timing requirements.

At 360, the PA layer 330 transmits the RACH request to the PHY layer 340. The PA layer 330 instructs the PHY layer 340 to transmit the selected preamble over the PRACH. The PRACH operates in the uplink direction (from UE to network) and is typically orthogonal to other channels. At 361, the PHY layer 340 wirelessly transmits the PRACH signal to the base station 150 of the satellite 120A to establish a connection between the UE 110 and the satellite 120.

On the network side, the base station 150 receives the preambles from multiple UEs 110. The base station 150 uses advanced signal processing techniques to detect and decode the received preambles. Once the preamble is successfully detected and decoded, the base station 150 identifies the UE 110 that transmitted the corresponding preamble. This identification allows for establishment of a connection with the correct UE. Based on the preamble reception, the network allocates resources for further communication, such as assigning a temporary identifier (RNTI-Radio Network Temporary Identifier) to the UE 110. After successful preamble detection and UE identification, the network sends an acknowledgment (RA response) to the UE 110 to indicate that access has been granted.

FIGS. 4A-6 are flow charts that illustrates examples of methods in accordance with the disclosed embodiments. With respect to FIGS. 4A-6, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIGS. 1-3. In certain embodiments, some or all steps of this process, and/or substantially equivalent steps, are performed by execution of processor-readable instructions stored or included on a processor-readable medium. For instance, in the description of FIGS. 4A-6 that follows, the UE(s), base stations, satellites, adaptive antenna array system, etc. may be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIGS. 4A-6, a particular example is described in which a UE performs certain actions by interacting with other elements of the system 100.

Figure 4A:
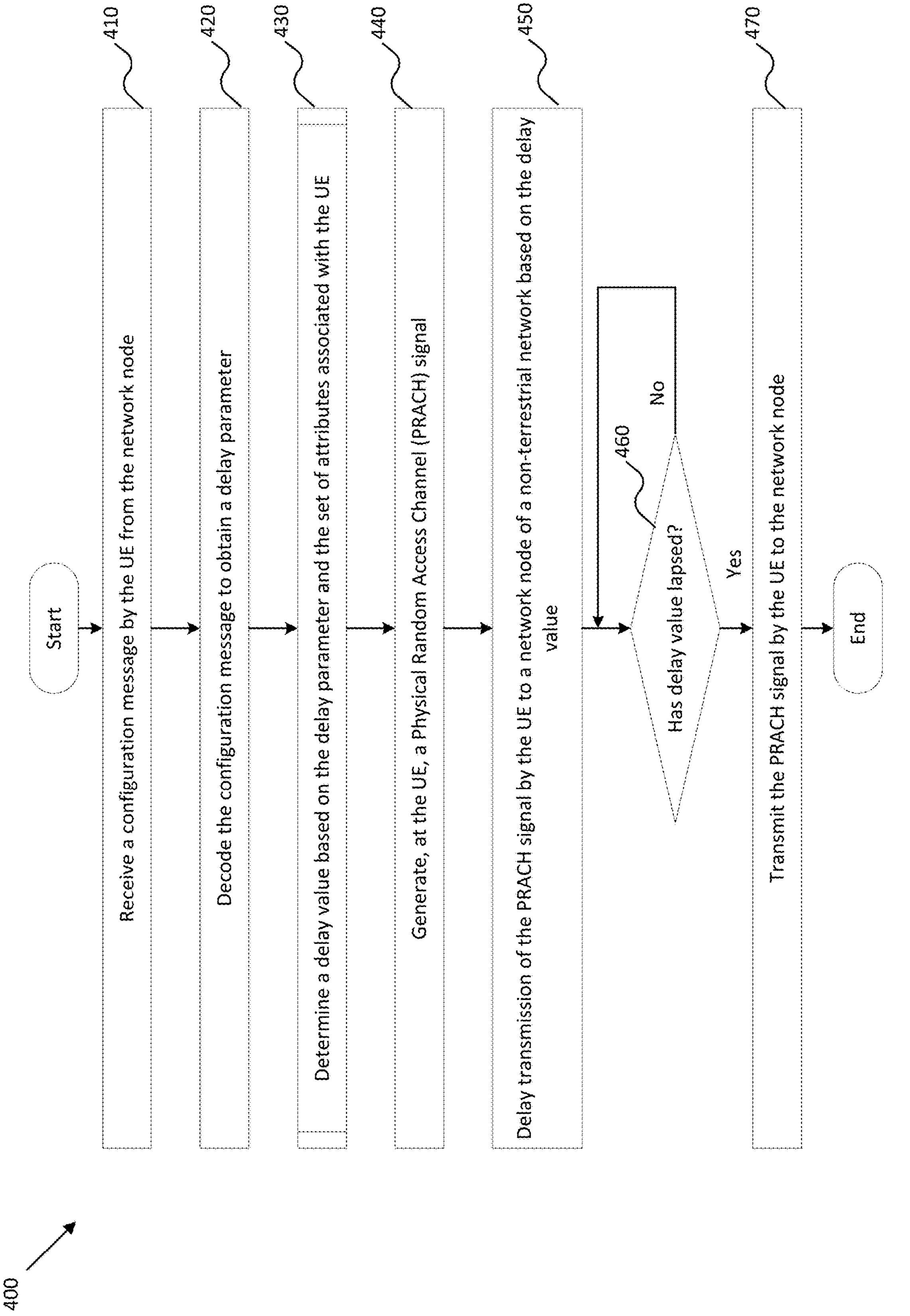
FIGS. 4A-4C, collectively, represent a flowchart illustrating one example of a method for communication by a UE according to aspects of the disclosed technology.
Figure 4B:
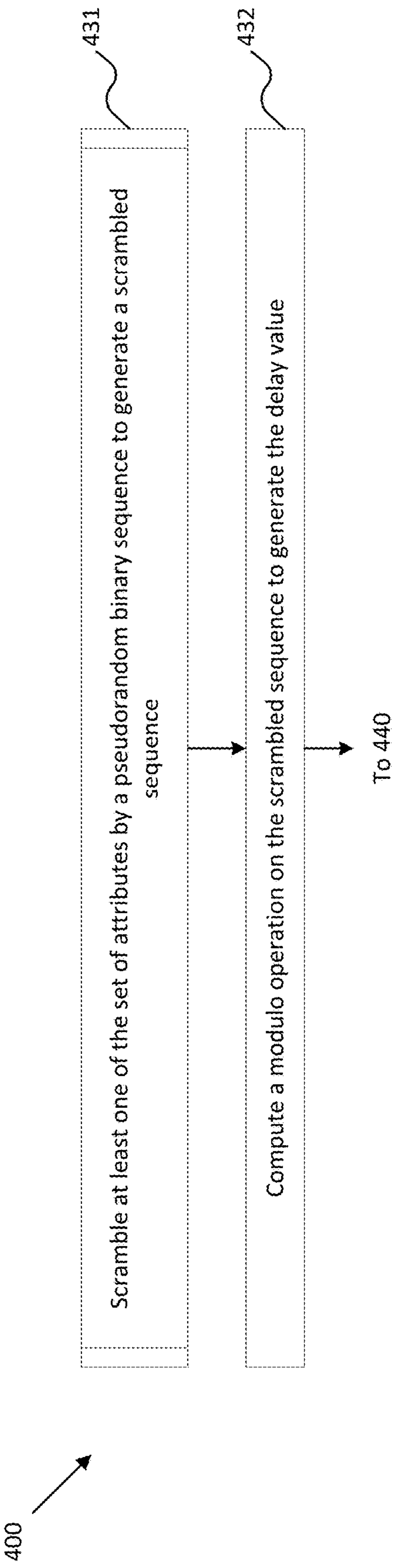
Figure 4C:
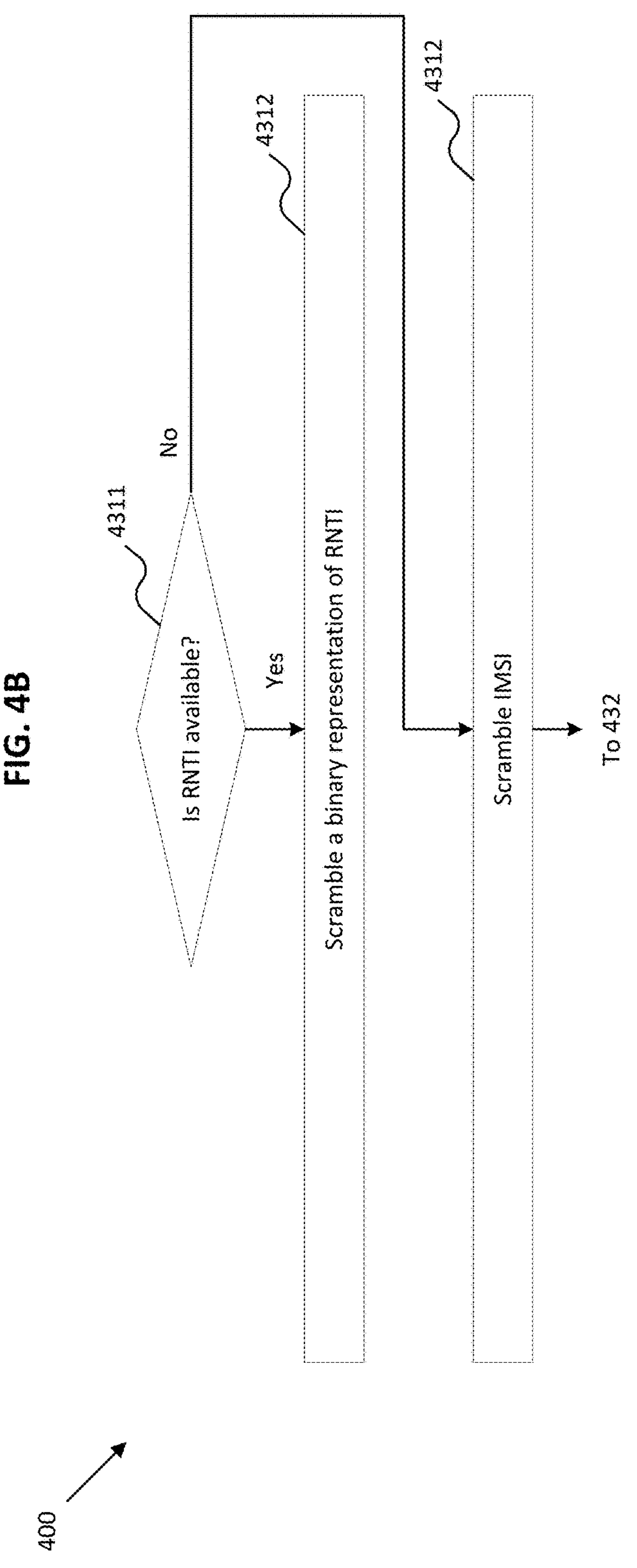

FIGS. 4A-4C, collectively, represent a flow diagram illustrating an example of method 400 performed by the UE 110 according to aspects of the disclosed technology.

Referring now to FIG. 4A, at 410, the UE 110 receives a configuration message from satellite 120. The configuration message is received by way of SIB1 and includes a set of parameters comprising at least one of: the set of PRACH time-frequency resources, the PRACH Preamble format, the set of PRACH preamble sequences, and the delay parameter.

Upon receiving the configuration message, at 420, the UE 110 decodes the configuration message to obtain the delay parameter. The delay parameter is a bit encoded field in the configuration message and indicates to one of enable and disable delaying the transmission of the PRACH signal. At 430, the UE 110 determines (e.g., computes) the delay value based on the delay parameter and the set of attributes associated with the UE 110. The set of attributes comprises at least one attribute uniquely identifying the UE 110 such as the IMEI, the IMSI, the RNTI from a previous session, or any combination thereof. Because the set of attributes is unique to the UE 110, it delay value will be different for UE 110 in comparison to the delay values of other UEs.

In some embodiments, the delay value is an arbitrary random delay which may be a pseudorandom binary sequence associated with the UE 110. In one non-limiting embodiment, the UE 110 may determine the delay value by performing processing that will be described with reference to FIG. 4B. Referring now to FIG. 4B, to determine the delay value, at 431, the UE 110 may scramble at least one of the set of attributes by the pseudorandom binary sequence to generate the scrambled sequence, and at 432, the UE 110 computes a modulo operation on the scrambled sequence to generate the delay value. The pseudorandom binary sequences may be generated using linear-feedback shift registers. With a suitable polynomial and a unique incoming number, such as the IMEI, the IMSI or the RNTI, the output bitstream is close to random. In some embodiments, the output bitstream is translated into a random number that is mapped by the mod function into a random number in the space of the mod function.

In one non-limiting embodiment, the UE 110 may scramble at least one of the set of attributes by performing processing that will be described with reference to FIG. 4C. Referring now to FIG. 4C, to scramble at least one of the set of attributes by the pseudorandom binary sequence, at 4311, the UE 110 determines whether the RNTI is available. When the UE 110 determines that the RNTI is available (at 4311), the UE 110 scrambles a binary representation of the RNTI at 4312. When the UE 110 determines that the RNTI is unavailable (at 4311), the UE 110 scrambles the IMSI at 4312.

Referring back to FIG. 4A, at 440, the UE 110 generates the PRACH signal processible by the network node to establish a connection between the UE 110 and the satellite 120. At 450, the UE 110 delays transmission of the PRACH signal to the network node of the non-terrestrial network based on the delay value. At 460, the UE 110 determines whether a time period corresponding to the delay value has lapsed. If at 460, the UE 110 determines that the time period corresponding to the delay value has not lapsed, 460 is executed again.

If at 460, the UE 110 determines that the time period corresponding to the delay value has lapsed, 470 is executed. At 470, the UE 110 transmits the PRACH signal to the satellite 120. The UE 110 initiates transmission of the PRACH signal to the network node when the UE 110 is in one of: the idle state, the inactive state, and the connection failed state.

It will be understood by a person skilled in the art that while the aforementioned method 400 is described as being implemented at a single UE, the method 400 may be implemented in multiple UEs 110 simultaneously (e.g., when multiple UEs 110 are in the coverage area or region of the base station. By randomly delaying transmission of the PRACH signal at each UE by an arbitrary delay value (e.g., delay time), the random access procedure attempts by the UEs can be more uniformly distributed over time, which can reduce the number of PRACH occasions, preambles and resources spent on resolving contentions. As such, different UEs may request connections with the base station in accordance with different arbitrary random delay values (e.g., such that PRACH signals are transmitted at different times) to help reduce contention for a connection to the base station. This way the likelihood that the PRACH signals will arrive at the base station at the same time can also be reduced. This is true even when large numbers of UEs may be located in a relatively coverage area of the base station at any given time, and even though the base station moves at a relatively high rate of speed over the particular coverage area due to the fact that it is part of a satellite.

When a large number of UEs fall within a coverage area of the beam of a base station at the same time and/or have the need to re-establish the UL synchronization to the base station, randomly delaying transmission of the PRACH signal at each UE by an arbitrary delay value (e.g., delay time) may help ensure that PRACH signals transmitted from different UEs are randomly delayed with respect to each other. Because each UE transmits its PRACH signal after its unique delay, the likelihood of PRACH signals from different UEs arriving at the particular base station at the same time can be reduced significantly. This can significantly reduce the number of UE contentions at the base station, and can also reduce additional base station-UE messaging for resolving such contentions. This can reduce the likelihood of or prevent overloading the PRACH processing resources at base station. The disclosed embodiments may also allow less hardware resources to be utilized at the base station to process the PRACH decoding. The disclosed embodiments may also reduce the number of PRACH time and frequency occasions. This can allow for an increased overall cell throughput and a larger number of UEs to be served.

Figure 5:
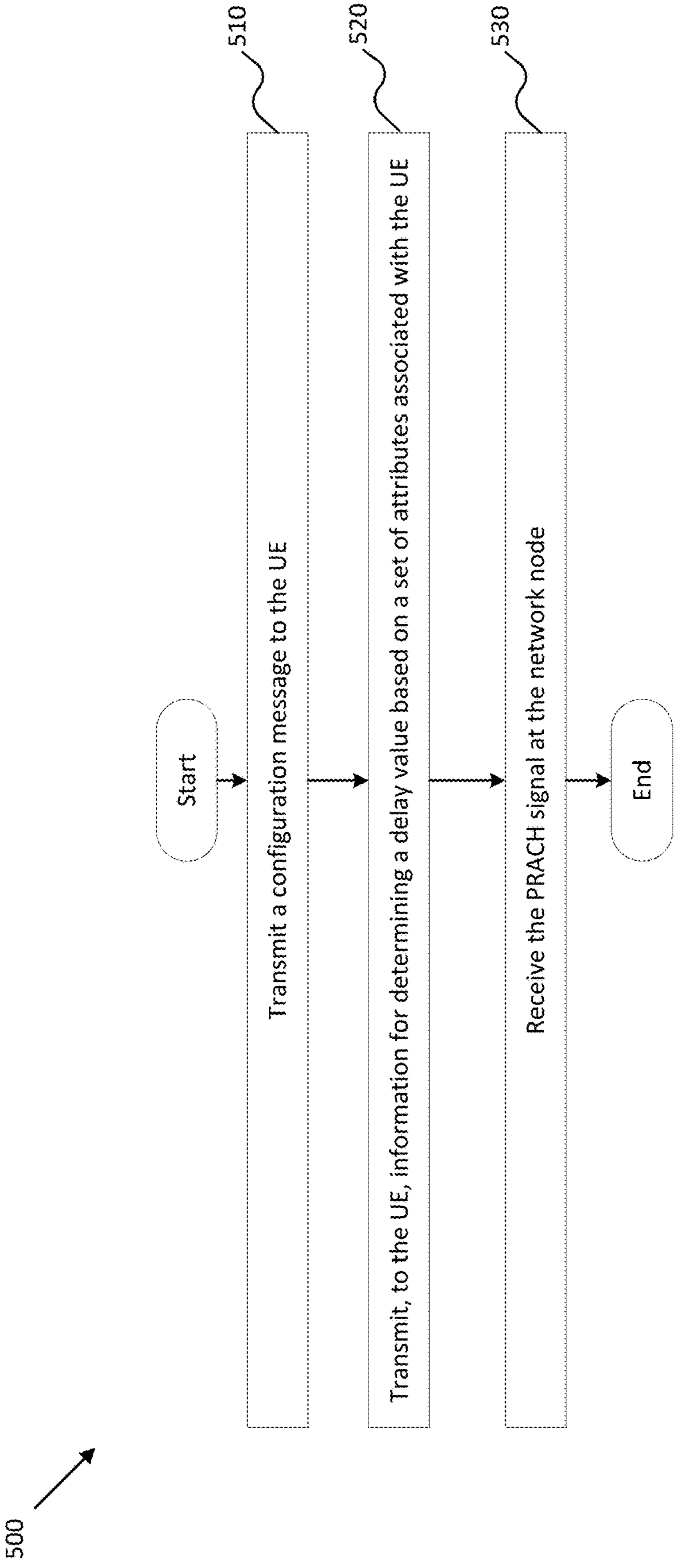
FIG. 5 is a flowchart that illustrates a method for establishing a connection between a satellite and a UE according to aspects of the disclosed technology.
Figure 6:
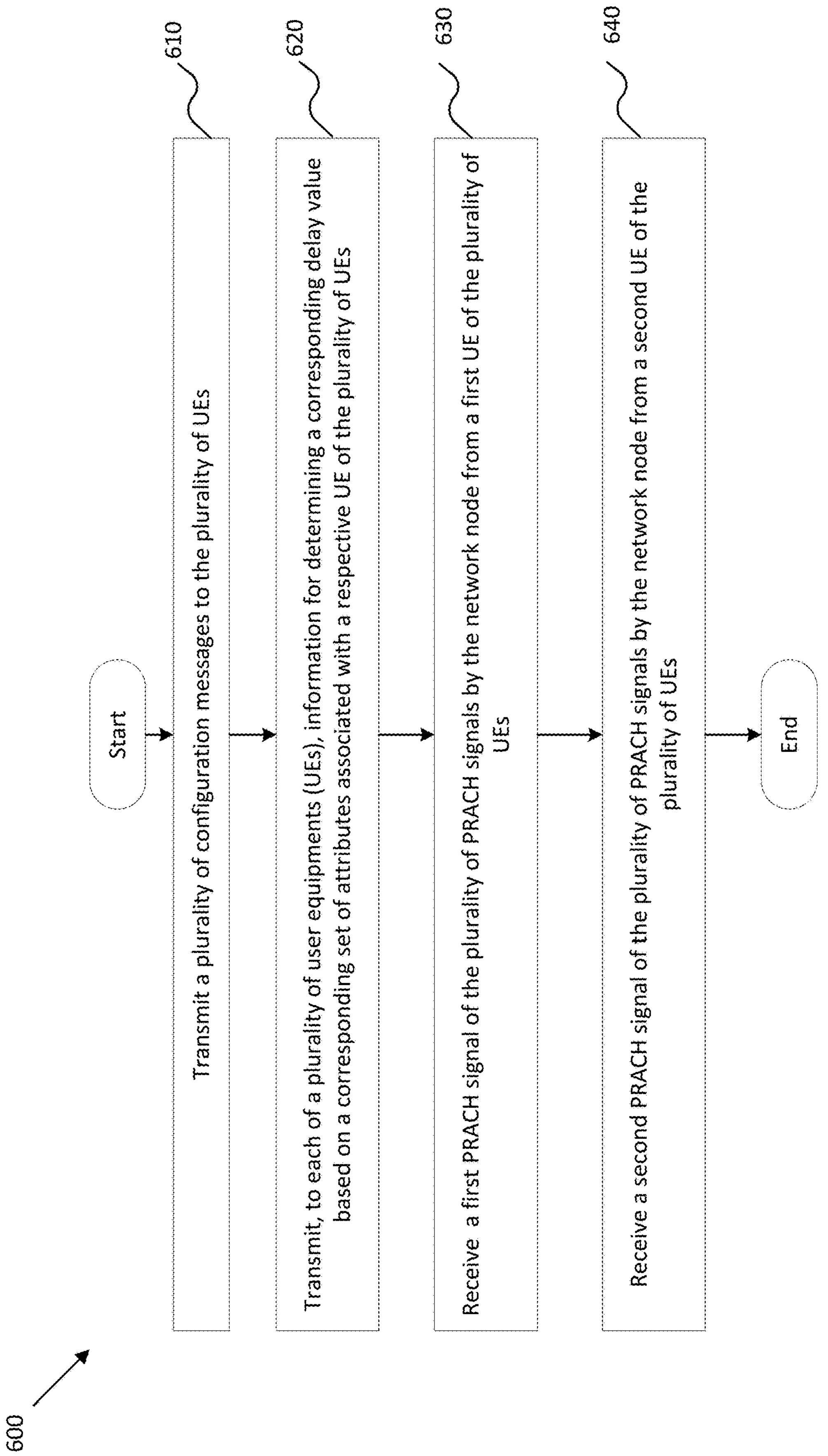
FIG. 6 is a flowchart that illustrates a method for establishing a connection between a satellite and multiple UEs according to aspects of the disclosed technology.

FIGS. 5 and 6 are flow charts illustrating exemplary methods 500, 600 performed by a base station 150 of a satellite 120 according to aspects of the disclosed technology.

FIG. 5 is a flowchart that illustrates a method 500 for establishing a connection between a satellite 120 and a UE 110 according to aspects of the disclosed technology. For purposes of illustration, the method 500 of FIG. 5 will be described with reference to the satellite 120A and UEs 110A of FIG. 1A.

At 510, the base station 150A of satellite 120A transmits the configuration message to the UE 110A. At 520, the base station 150A transmits information to the UE 110A for determining the delay value based on the set of attributes associated with the UE 110A.

The UE 110A determines the delay value and delays the transmission of the PRACH signal based on the delay value (e.g., delays transmission of the PRACH signal by an amount of time equal to the delay value). Because the delay value is determined (e.g., computed) based on based on information that is unique to UE 110A, such as, a an IMEI, an IMSI, a UE RNTI from a previous session, or a combination thereof, the delay value is an arbitrary random delay (e.g., a pseudorandom binary sequence associated with the UE 110A). As such, there is a high probability that the delay value that is computed by the UE 110A is different than that of other UEs, and therefore the likelihood of PRACH signals from different UEs arriving at the particular base station at the same time can be reduced significantly. Because PRACH signals from different UEs are transmitted at different times in accordance with different arbitrary random delay values, the connection requests with the base station are more uniformly distributed, which can help significantly reduce the number of UE contentions for a connection to the base station. This can help reduce the likelihood or prevent overloading the PRACH processing resources at base station, reduce additional base station-UE messaging for resolving such contentions, allow less HW resources to be utilized at the base station to process the PRACH decoding, and reduce the number of PRACH time and frequency occasions, while also allowing for an increased overall cell throughput and a larger number of UEs to be served.

At 530, the base station 150A of satellite 120A receives the PRACH signal that was transmitted from the UE 110A and processes it as described above.

FIG. 6 is a flowchart that illustrates a method 600 for establishing a connection between a satellite 120 and multiple UEs 110 according to aspects of the disclosed technology. For purposes of illustration, FIG. 6 will be described with reference to the satellite 120A and UEs 110A, 110B of FIG. 1A.

At 610, the satellite 120A transmits different configuration messages to each of the UEs 110A, 110B in coverage area 130A. At 620, the satellite 120 transmits information to each of the UEs 110A, 110B in coverage area 103A for determining a corresponding delay value, based on the corresponding set of attributes associated with the respective UE.

Each of the UEs 110A, 110B determine corresponding delay values and delay their respective transmissions of the PRACH signals based on the delay values that they have determined. As explained above, the first delay value can be determined (e.g., computed) based on information that is unique to UE 110A, such as, a an IMEI, an IMSI, a UE RNTI from a previous session, or a combination thereof. By contrast, the second delay value can be determined (e.g., computed) based on information that is unique to UE 110B, such as, an IMEI, an IMSI, a UE RNTI from a previous session, or a combination thereof. As a result, because the first delay value and the second delay value are different, the UEs 110A, 110B will transmit their respective PRACH signals with different delays at different times.

As such, in this simplified example, the first UE 110A determines the first delay value and generates the first PRACH signal, the second UE 110B determines the second delay value, that is different than the first delay value, and generates the second PRACH signal. Transmission of the PRACH signals will be delayed by the UEs 110A, 110B by a time period that is equal to their respective delay values, which as explained above, are different.

At 630, the satellite 120 receives a first PRACH signal from the first UE 110A, and at 640, the satellite 120 receives a second PRACH signal from the second UE 110B. As described above, the first PRACH signal is transmitted from the first UE 110A after a first time period elapses (that corresponds to a first delay value), and the second PRACH signal is transmitted from the second UE 110B after a second time period elapses (that corresponds to a second delay value). Notably, the second time period and the second delay value are different than the first time period and the first delay value. As such, the satellite 120 receives (and subsequently processes) the first PRACH signal at a different time than when it receives the second PRACH signal (e.g., receives the first PRACH signal earlier than the second PRACH signal, or receives the first PRACH signal later than the second PRACH signal).

Because different UEs may request connections with the base station in accordance with different arbitrary random delay values (e.g., such that PRACH signals are transmitted at different times) this may help reduce contention for a connection to the base station. Because the random access procedure attempts by the UEs are more uniformly distributed over time, the number of PRACH occasions, preambles and resources spent on resolving contentions can be reduced. This can help prevent overloading the PRACH processing resources at the base station (e.g., when a large amount of UEs fall within the coverage area of the beam of the base station at the same time). Because the number of UE contentions at the base station can be significantly reduced this can reduce additional base station-UE messaging for resolving such contentions. In addition, less hardware resources are utilized at the base station to process the PRACH decoding, while also reducing the number of PRACH time and frequency occasions. This can allow for an increased overall cell throughput and a larger number of UEs to be served.

Figure 7:
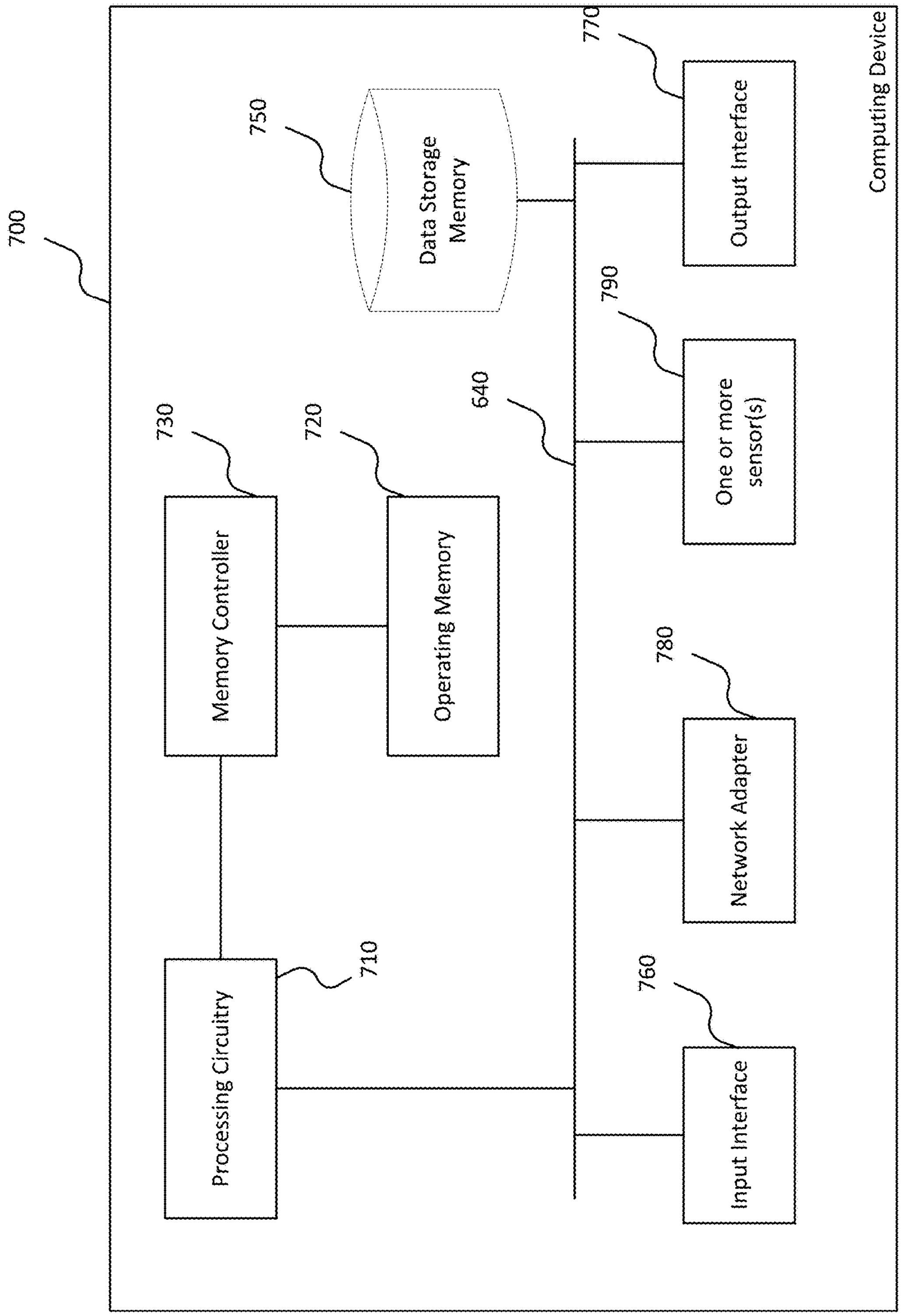
FIG. 7 is a diagram illustrating one example of computing device in which aspects of the technology may be practiced.

FIG. 7 is a diagram illustrating one example of computing device 700 in which aspects of the technology may be practiced. Computing device 700 may be virtually any type of general-purpose or specific-purpose computing device. For example, computing device 700 may be an example of the processor 220 or a processor of the satellite 120, a computing system or device associated with any entity (e.g., UE 110, satellite 120) as described above with reference to FIGS. 1-6.

As illustrated in FIG. 7, computing device 700 includes processing circuit 710, operating memory 720, memory controller 730, data storage memory 750, input interface 760, output interface 770, network adapter(s) 780, and in some embodiments, one or more sensor(s) 790. Each of these afore-listed components of computing device 700 includes at least one hardware element.

Computing device 700 includes at least one processing circuit 710 configured to execute instructions, such as instructions for implementing the herein-described workloads, processes, or technology. Processing circuit 710 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 720 during run-time of computing device 700. Operating memory 720 may also include any of a variety of data storage devices/components, such as volatile memories, semi-volatile memories, random access memories, static memories, caches, buffers, or other media used to store run-time information. In one example, operating memory 720 does not retain information when computing device 700 is powered off. Rather, computing device 700 may be configured to transfer instructions from a non-volatile data storage component (e.g., data storage component 750) to operating memory 720 as part of a booting or other loading process. In some examples, other forms of execution may be employed, such as execution directly from data storage component 750.

Operating memory 720 may include 4th generation double data rate (DDR4) memory, 3rd generation double data rate (DDR3) memory, other dynamic random access memory (DRAM), High Bandwidth Memory (HBM), Hybrid Memory Cube memory, 3D-staked memory, static random access memory (SRAM), magneto resistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 710 via memory controller 730 in channels. One example of computing device 700 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 720 specifically does not include or encompass communications media, any communications medium, or any signals per se.

Memory controller 730 is configured to interface processing circuit 710 to operating memory 720. For example, memory controller 730 may be configured to interface commands, addresses, and data between operating memory 720 and processing circuit 710. Memory controller 730 may also be configured to abstract or otherwise manage certain aspects of memory management from or for processing circuit 710. Although memory controller 730 is illustrated as single memory controller separate from processing circuit 710, in other examples, multiple memory controllers may be employed, memory controller(s) may be integrated with operating memory 720, or the like. Further, memory controller(s) may be integrated into processing circuit 710. These and other variations are possible.

In computing device 700, data storage memory 750, input interface 760, output interface 770, network adapter 780, and sensors 790 may be interfaced to processing circuit 710 by bus 740. Although, FIG. 7 illustrates bus 740 as a single passive bus, other configurations, such as a collection of buses, a collection of point-to-point links, an input/output controller, a bridge, other interface circuitry, or any collection thereof may also be suitably employed for interfacing data storage memory 750, input interface 760, output interface 770, or network adapter 780 to processing circuit 710.

In computing device 700, data storage memory 750 is employed for long-term non-volatile data storage. Data storage memory 750 may include any of a variety of non-volatile data storage devices/components, such as non-volatile memories, disks, disk drives, hard drives, solid-state drives, or any other media that can be used for the non-volatile storage of information. However, data storage memory 750 specifically does not include or encompass communications media, any communications medium, or any signals per se. In contrast to operating memory 720, data storage memory 750 is employed by computing device 700 for non-volatile long-term data storage, instead of for run-time data storage.

Also, computing device 700 may include or be coupled to any type of processor-readable media such as processor-readable storage media (e.g., operating memory 720 and data storage memory 750) and communication media (e.g., communication signals and radio waves). While the term processor-readable storage media includes operating memory 720 and data storage memory 750, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 700 also includes input interface 760, which may be configured to enable computing device 700 to receive input from users or from other devices, such as sensors 790, in some embodiments. In addition, computing device 700 includes output interface 770, which may be configured to provide output from computing device 700.

In the illustrated example, computing device 700 is configured to communicate with other computing devices or entities via network adapter 780. Network adapter 780 may include a wired network adapter, e.g., an Ethernet adapter, a Token Ring adapter, or a Digital Subscriber Line (DSL) adapter. Network adapter 780 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 700 is illustrated with certain components configured in a particular arrangement, these components and arrangement are merely one example of a computing device in which the technology may be employed. In other examples, data storage memory 750, input interface 760, output interface 770, or network adapter 780 may be directly coupled to processing circuit 710, or be coupled to processing circuit 710 via an input/output controller, a bridge, or other interface circuitry. Other variations of the technology are possible.

Some examples of computing device 700 include at least one memory (e.g., operating memory 720) adapted to store run-time data and at least one processor (e.g., processing circuit 710) that is adapted to execute processor-executable code that, in response to execution, enables computing device 700 to perform actions, where the actions may include, in some examples, actions for one or more methodologies or processes described herein, such as, methods 400, 500, and 600 of FIGS. 4A-6, as described above.

In some embodiments, when the device or system include one or more sensors 790, the sensors may be configured to sense or gather data pertaining to the surrounding environment or operation of the device or system. Some exemplary sensors capable of being electronically coupled with the device or system of the present disclosure (either directly connected to the device or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; photo/Light sensors sensing ambient light intensity, ambient, day/night, UV exposure; TV/IR sensors sensing light wavelength; temperature sensors sensing machine or motor temperature, ambient air temperature, and environmental temperature; and moisture sensors for sensing surrounding moisture levels.

The device or system of the present disclosure may include wireless communication logic coupled to sensors on the device or system. The sensors gather data and provide the data to the wireless communication logic. Then, the wireless communication logic may transmit the data gathered from the sensors to a remote device. Thus, the wireless communication logic may be part of a broader communication system, in which one or several devices or systems of the present disclosure may be networked together to report alerts and, more generally, to be accessed and controlled remotely. Depending on the types of transceivers installed in the device or system of the present disclosure, the system may use a variety of protocols (e.g., Wifi, ZigBee, MiWi, Bluetooth) for communication. In one example, each of the devices or systems of the present disclosure may have its own IP address and may communicate directly with a router or gateway. This would typically be the case if the communication protocol is WiFi.

In another example, a point-to-point communication protocol like MiWi or ZigBee is used. One or more of the device or system of the present disclosure may serve as a repeater, or the devices or systems of the present disclosure may be connected together in a mesh network to relay signals from one device or system to the next. However, the individual device or system in this scheme typically would not have IP addresses of their own. Instead, one or more of the devices or system of the present disclosure communicates with a repeater that does have an IP address, or another type of address, identifier, or credential that may be needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system also allows individuals to access the device or system of the present disclosure for configuration and diagnostic purposes. In that case, the individual processors or microcontrollers of the device or system of the present disclosure may be configured to act as Web servers that use a protocol like hypertext transfer protocol (HTTP) to provide an online interface that can be used to configure the device or system. In some embodiments, the systems may be used to configure several devices or systems of the present disclosure at once. For example, if several devices or systems are of the same model and are in similar locations in the same location, it may not be to configure the devices or systems individually. Instead, an individual may provide configuration information, including baseline operational parameters, for several devices or systems at once.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software-controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term “effecting” or a phrase or claim element beginning with the term “effecting” should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of “effecting an event to occur” would mean that a first party is giving a second party the tools or resources needed for the second party to perform the event, however the affirmative single action is the responsibility of the first party to provide the tools or resources to cause said event to occur.

When a feature or element is herein referred to as being “on” another feature or element, it can be directly on the other feature or element or intervening features and/or elements may also be present. In contrast, when a feature or element is referred to as being “directly on” another feature or element, there are no intervening features or elements present. It will also be understood that, when a feature or element is referred to as being “connected”, “attached” or “coupled” to another feature or element, it can be directly connected, attached or coupled to the other feature or element or intervening features or elements may be present. In contrast, when a feature or element is referred to as being “directly connected”, “directly attached” or “directly coupled” to another feature or element, there are no intervening features or elements present. Although described or shown with respect to one embodiment, the features and elements so described or shown can apply to other embodiments. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “above”, “behind”, “in front of”, and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,” “some embodiments,” “one particular embodiment,” “an example embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an example embodiment,” “an exemplary embodiment,” or “other embodiments,” or the like, are not necessarily all referring to the same embodiments. References in the specification to “an embodiment,” “one embodiment,” “some embodiments,” “one particular embodiment,” “an example embodiment,” “an exemplary embodiment,” or “other embodiments,” or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

In the discussion, unless otherwise stated, adjectives such as “substantially” and “about” modifying a condition or relationship characteristic of a feature or features of an embodiment of the disclosure, are understood to mean that the condition or characteristic is defined to within tolerances that are acceptable for operation of the embodiment for an application for which it is intended. As used herein in the specification and claims, including as used in the examples and unless otherwise expressly specified, numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, transitional phrases such as “comprising,” “including,” “carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

The description and illustration of various embodiments of the disclosure are examples and the disclosure is not limited to the exact details shown or described. While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed:

1. A method for communication by a user equipment (UE), the method comprising:

determining a delay value based on a set of attributes associated with the UE, wherein the set of attributes comprises at least one attribute uniquely identifying the UE;

generating, at the UE, a Physical Random Access Channel (PRACH) signal; and delaying transmission of the PRACH signal by the UE to a network node of a non-terrestrial network based on the delay value, wherein the PRACH signal is processible by the network node to establish a connection between the UE and the network node.

2. The method of claim 1, further comprising:

receiving a configuration message by the UE from the network node; and decoding the configuration message to obtain a delay parameter.

3. The method of claim 2, wherein determining the delay value comprises:

determining the delay value based on the delay parameter and the set of attributes associated with the UE, wherein the set of attributes comprises at least one attribute uniquely identifying the UE.

4. The method of claim 2, wherein the delay value is determined after the configuration message is decoded.

5. The method of claim 2, wherein the configuration message is received by way of a system information block 1 (SIB1).

6. The method of claim 2, wherein the configuration message comprises a set of parameters comprising at least one of: a set of PRACH time-frequency resources, a PRACH Preamble format, a set of PRACH preamble sequences, and the delay parameter.

7. The method of claim 2, wherein the delay parameter is a bit encoded field in the configuration message.

8. The method of claim 2, wherein the delay parameter indicates to one of enable and disable delaying the transmission of the PRACH signal.

9. The method of claim 1, further comprising:

transmitting the PRACH signal by the UE to the network node after a time period corresponding to the delay value has lapsed.

10. The method of claim 1, wherein the set of attributes comprises at least one of: an International Mobile Subscriber Identity (IMSI) number, a Radio Network Temporary Identifier (RNTI), and an International Mobile Equipment Identity (IMEI).

11. The method of claim 1, wherein the set of attributes is from a previous communication session.

12. The method of claim 1, wherein the delay value is an arbitrary random delay associated with the UE.

13. The method of claim 12, wherein the arbitrary random delay is a pseudorandom binary sequence associated with the UE.

14. The method of claim 1, wherein the determining the delay value further comprises:

scrambling at least one of the set of attributes by a pseudorandom binary sequence to generate a scrambled sequence; and computing a modulo operation on the scrambled sequence to generate the delay value.

15. The method of claim 13, wherein the scrambling the at least one of the set of attributes comprises at least one of:

scrambling a binary representation of a Radio Network Temporary Identifier (RNTI) when the RNTI is available; and scrambling an International Mobile Subscriber Identity (IMSI) number when the RNTI is unavailable.

16. The method of claim 1, wherein the UE initiates transmission of the PRACH signal to the network node when the UE is in one of: an idle state, an inactive state, and a connection failed state.

17. The method of claim 1, wherein the network node is a base station of a satellite.

18. A method for communication by a network node in a non-terrestrial network, the method comprising:

transmitting, to a user equipment (UE), information for determining a delay value based on a set of attributes associated with the UE, wherein the set of attributes comprises at least one attribute uniquely identifying the UE; and receiving, at the network node, a Physical Random Access Channel (PRACH) signal from the UE, wherein transmission of the PRACH signal by the UE to the network node is delayed based on the delay value, wherein the PRACH signal is processible by the network node to establish a connection between the UE and the network node.

19. The method of claim 18, further comprising:

transmitting a configuration message to the UE, wherein the configuration message is decoded by the UE to obtain a delay parameter, wherein the delay value is determined based on the delay parameter and the set of attributes associated with the UE, wherein the set of attributes comprises at least one attribute uniquely identifying the UE, wherein the set of attributes comprises at least one of: an International Mobile Subscriber Identity (IMSI) number, a Radio Network Temporary Identifier (RNTI), and an International Mobile Equipment Identity (IMEI), wherein the delay value is determined after the configuration message is decoded, wherein the configuration message comprises a set of parameters comprising at least one of: a set of PRACH time-frequency resources, a PRACH Preamble format, a set of PRACH preamble sequences, and the delay parameter, wherein the delay parameter indicates to one of enable and disable delaying the transmission of the PRACH signal by the UE to the network node.

20. The method of claim 18, wherein the delay value is generated at the UE by:

scrambling at least one of the set of attributes by a pseudorandom binary sequence to generate a scrambled sequence; and computing a modulo operation on the scrambled sequence to generate the delay value.

21. The method of claim 18, wherein the UE initiates transmission of the PRACH signal to the network node when the UE is in one of: an idle state, an inactive state, and a connection failed state.

22. An apparatus for communication at a user equipment (UE), the apparatus comprising:

at least one processor; and a memory coupled to the processor, the processor and the memory configured to:

determine a delay value based on a set of attributes associated with the UE, wherein the set of attributes comprises at least one attribute uniquely identifying the UE;

generate a Physical Random Access Channel (PRACH) signal; and delay transmission of the PRACH signal by the UE to a network node of a non-terrestrial network based on the delay value to establish a connection between the UE and the network node.

23. An apparatus for communication at a network node in a non-terrestrial network, the apparatus comprising:

at least one processor; and a memory coupled to the processor, the processor and the memory configured to:

transmit, to a user equipment (UE), information for determining a delay value based on a set of attributes associated with the UE, wherein the set of attributes comprises at least one attribute uniquely identifying the UE; and receive a Physical Random Access Channel (PRACH) signal, wherein transmission of the PRACH signal by the UE to the network node is delayed based on the delay value to establish a connection between the UE and the network node.

* * * * *